United States Patent
Shakagoori et al.

(10) Patent No.: US 9,457,493 B2
(45) Date of Patent: Oct. 4, 2016

(54) METHOD FOR PRODUCING CYLINDRICAL NANOIMPRINTING MOLD AND METHOD FOR PRODUCING NANOIMPRINTING REPRODUCTION MOLD

(71) Applicant: Mitsubishi Rayon Co., Ltd., Tokyo (JP)

(72) Inventors: Shinya Shakagoori, Kanagawa (JP); Makoto Ookawa, Kanagawa (JP); Kazuya Takanashi, Kanagawa (JP); Katsumi Hara, Kanagawa (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 0 days.

(21) Appl. No.: 14/910,956

(22) PCT Filed: Aug. 11, 2014

(86) PCT No.: PCT/JP2014/071193
§ 371 (c)(1),
(2) Date: Feb. 8, 2016

(87) PCT Pub. No.: WO2015/022935
PCT Pub. Date: Feb. 19, 2015

(65) Prior Publication Data
US 2016/0200006 A1 Jul. 14, 2016

(30) Foreign Application Priority Data

Aug. 14, 2013 (JP) ................. 2013-168537
Aug. 14, 2013 (JP) ................. 2013-168538
Aug. 14, 2013 (JP) ................. 2013-168540
Jan. 30, 2014 (JP) ................. 2014-015864
Jan. 30, 2014 (JP) ................. 2014-016042

(51) Int. Cl.
*B29C 33/38* (2006.01)
*B05D 3/12* (2006.01)
(Continued)

(52) U.S. Cl.
CPC ........... *B29C 33/3842* (2013.01); *B05D 3/102* (2013.01); *B05D 3/12* (2013.01);
(Continued)

(58) Field of Classification Search
None
See application file for complete search history.

(56) References Cited

U.S. PATENT DOCUMENTS 4,839,005 A * 6/1989 Katsumoto .............. B23H 5/08
204/217
6,838,297 B2 * 1/2005 Iwasaki ............... B81C 1/00087
205/228

(Continued)

FOREIGN PATENT DOCUMENTS

JP 2007-030146 A 2/2007
JP 4617402 B 1/2011

(Continued)

OTHER PUBLICATIONS

International Search Report for PCT/JP2014/071193 mailed Sep. 22, 2014; English Translation submitted herewith (4 pages).

*Primary Examiner* — Allan Olsen
(74) *Attorney, Agent, or Firm* — Fitch, Even, Tabin & Flannery LLP

(57) ABSTRACT

Provided is a method for producing a cylindrical nanoimprinting mold such that the outer peripheral surface of a cylindrical aluminum substrate is uniformly polished, and it is possible to effectively take advantage of the outer peripheral surface. The method forms an oxide film at the outer peripheral surface (14) of an aluminum substrate (10) after polishing the entire outer peripheral surface (14) of the cylindrical aluminum substrate (10) by means of a polishing body (26), wherein the polishing body (26) is moved in the axial direction to polish in a manner such that at least a portion of the polishing body (26) is protruding beyond the first end (10a) side and second end (10b) side of the aluminum substrate (10), and the portion of the polishing body (26) protruding beyond the aluminum substrate (10) is disposed on and supported by a cylindrical first support member (18); and second support member (20).

26 Claims, 13 Drawing Sheets

(51) Int. Cl.
   *B05D 3/10*      (2006.01)
   *C23C 26/00*     (2006.01)
   *B05D 5/00*      (2006.01)
   *B29C 59/02*     (2006.01)

(52) U.S. Cl.
   CPC .............. *B05D 5/00* (2013.01); *B29C 59/022* (2013.01); *C23C 26/00* (2013.01); *B29C 2059/023* (2013.01); *B29K 2905/02* (2013.01)

(56) References Cited

U.S. PATENT DOCUMENTS

| | | | | |
|---|---|---|---|---|
| 8,524,134 B2 * | 9/2013 | Hubbard | ............ | B29C 33/3842 264/219 |
| 8,545,708 B2 * | 10/2013 | Fujii | ............ | B29C 33/38 205/223 |
| 8,597,767 B2 * | 12/2013 | Yamada | ............ | B29C 33/3842 428/141 |
| 8,881,402 B2 * | 11/2014 | Hsu | ............ | B29D 11/00788 205/173 |
| 8,889,220 B2 * | 11/2014 | Hayashi | ............ | B29C 33/60 118/313 |
| 8,950,324 B2 * | 2/2015 | Berniard | ............ | B41K 3/28 101/250 |
| 8,999,133 B2 * | 4/2015 | Isurugi | ............ | B29C 33/424 205/108 |
| 9,045,832 B2 * | 6/2015 | Murazumi | ............ | C22F 1/183 |
| 9,057,143 B2 * | 6/2015 | Kita | ............ | C22C 21/06 |
| 9,108,351 B2 * | 8/2015 | Nakamatsu | ............ | B29C 45/372 |
| 9,127,371 B2 * | 9/2015 | Isurugi | ............ | C25D 11/12 |
| 9,138,775 B2 * | 9/2015 | Otani | ............ | B29C 59/046 |
| 9,138,936 B2 * | 9/2015 | Kita | ............ | B29C 33/38 |
| 9,193,096 B2 * | 11/2015 | Isurugi | ............ | B29C 33/38 |
| 9,315,916 B2 * | 4/2016 | Hayashi | ............ | C25D 17/005 |
| 9,366,785 B2 * | 6/2016 | Minoura | ............ | B29C 33/424 |
| 2005/0170494 A1 * | 8/2005 | Mukai | ............ | G01N 21/554 435/287.2 |
| 2006/0234396 A1 * | 10/2006 | Tomita | ............ | B82Y 10/00 438/3 |
| 2009/0194914 A1 | 8/2009 | Uozu et al. | | |
| 2010/0243458 A1 | 9/2010 | Kojima et al. | | |
| 2010/0258978 A1 | 10/2010 | Yamada et al. | | |
| 2011/0157704 A1 | 6/2011 | Sato et al. | | |
| 2012/0171427 A1 | 7/2012 | Kita et al. | | |
| 2014/0224297 A1 * | 8/2014 | Hayashi | ............ | C22C 12/00 136/230 |

FOREIGN PATENT DOCUMENTS

| | | |
|---|---|---|
| JP | 2012-037670 A | 2/2012 |
| WO | 2008/001847 A1 | 1/2008 |
| WO | 2009/054513 A1 | 4/2009 |
| WO | 2009/107294 A1 | 9/2009 |
| WO | 2009/145049 A1 | 12/2009 |
| WO | 2011/030850 A1 | 3/2011 |

* cited by examiner

METHOD FOR PRODUCING CYLINDRICAL NANOIMPRINTING MOLD AND METHOD FOR PRODUCING NANOIMPRINTING REPRODUCTION MOLD

CROSS-REFERENCE TO RELATED APPLICATIONS

This application is a U.S. national phase application filed under 35 U.S.C. §371 of International Application No. PCT/JP2014/071193, filed Aug. 11, 2014, designating the United States, which claims priority from Japanese Patent Applications 2013-168537, 2013-168538, and 2013-168540, filed Aug. 14, 2013, and Japanese Patent Applications 2014-015864 and 2014-016042 filed Jan. 30, 2014, which are all hereby incorporated herein by reference in their entirety for all purposes.

TECHNICAL FIELD

The present invention relates to a method for producing a cylindrical nanoimprinting mold and a method for producing a nanoimprinting reproduction mold.

BACKGROUND ART

Recently, with a progress in micro processing techniques, it becomes possible to form a concave-convex microstructure of nano scale on a surface of an article. The concave-convex microstructure of nano scale exhibits a structure-derived function such as an antireflection function referred to as a moth-eye effect or a water repellant function referred to as a lotus effect. Therefore, the industrial use of the concave-convex microstructure of nano scale (improvement in light extraction efficiency of organic EL elements, antireflection of image display apparatuses, improvement in image clarity of image display apparatuses, water repellant materials for various members, or the like) is actively made.

As a method of forming a concave-convex microstructure on a surface of an article, for example, the following method is known:

a method of transferring a concave-convex microstructure on a surface of an article by using a cylindrical nanoimprinting mold in which an oxide film (anodic porous alumina) having a plurality of fine pores is formed on an outer peripheral surface of a cylindrical aluminum substrate.

The method is suitable for industrial production since the concave-convex microstructure can be formed on the surface of the article with few simple steps.

Further, as a method of forming an oxide film having a plurality of fine pores on a surface of an aluminum substrate, for example, the following method is known:

a method of anodizing a surface of an aluminum substrate after the surface of the aluminum substrate is polished (Patent Document 1).

When the surface of the aluminum substrate is polished before anodization is performed and the surface roughness is decreased to be uniform until the surface becomes a mirror surface, occurrence of unevenness in the oxide film can be suppressed. As a result, it is possible to form a concave-convex microstructure with higher accuracy on an article.

CITATION LIST

Patent Document

Patent Document 1: JP 2007-30146 A

SUMMARY OF THE INVENTION

Problem to be Solved by the Invention

As a method of polishing the whole outer peripheral surface of the cylindrical aluminum substrate, for example, a method to be described below is considered.

As illustrated in FIG. 11, a method in which a polishing body 116 is reciprocated from a first end 112a to a second end 112b of an aluminum substrate 112 in the axis direction while the polishing body 116 is pressed against an outer peripheral surface 114 of the aluminum substrate 112 so as to be rubbed by rotating the cylindrical aluminum substrate 112, which is disposed at a rotation axis 110, around the axis.

In this method, the vicinity of the first end 112a and the vicinity of the second end 112b of the aluminum substrate 112 come into contact with the polishing body 116 in a shorter time as compared with the case of the center portion of the aluminum substrate 112 in the axis direction. According to this, polishing is not sufficient in the vicinities of the ends and thus unevenness in the surface roughness occurs. Therefore, unevenness also easily occurs in an oxide film to be formed on the aluminum substrate. For this reason, in this case, the outer peripheral surface 114 on which an oxide film is formed and which is used to provide a concave-convex microstructure is defined to the range excluding the vicinities of the first end 112a and the second end 112b in the aluminum substrate 112.

However, the method of partially using the outer peripheral surface 114 of the aluminum substrate 112 in this way has a disadvantage in terms of production efficiency.

Further, the cylindrical aluminum substrate before polishing is performed is processed from an aluminum ingot into a predetermined shape by mechanical processing such as cutting processing, and it is necessary to finish the outer peripheral surface to have a mirror surface by polishing. As a polishing method of finishing the machined outer peripheral surface to have a mirror surface, from the viewpoint that it is necessary to remove a coarse portion of a surface shape formed by mechanical processing, a polishing method with a relatively high polishing rate is preferably used, and chemical mechanical polishing (CMP) in which mechanical polishing is performed while the surface of the aluminum substrate is dissolved is preferably used. In particular, it is preferable to perform polishing while stages of polishing are separately performed, for example, primary CMP polishing using an acidic CMP slurry for removing the machined surface is performed and then final CMP polishing using an alkaline CMP slurry for mirror surface finishing is performed.

However, in the above-described method, particularly, in primary CMP polishing using an acidic CMP slurry for removing the machined surface, due to a polishing solution staying on the outer peripheral surface of the cylindrical aluminum substrate, an excessively thick oxide film may be generated on the outer peripheral surface of the aluminum substrate after polishing, and thus transformation like a case where the outer peripheral surface is whitened may be observed in some cases. In this case, as the degree of the whitening caused by generation of a thick oxide film is strong, an excessively long polishing time is required for polishing of the whitened portion in final CMP polishing to obtain an aluminum substrate in a mirror-polished state. Therefore, productivity significantly decreases.

Further, when a mold is repeatedly used, a resin is accumulated on the surface of the mold, the surface of the mold is damaged, or the concave-convex microstructure is transformed. As a result, a problem arises in that a predetermined concave-convex microstructure cannot be transferred or damages on the surface of the mold become patterns and these patterns are transferred so that performance, such as anti-reflective properties, of a transfer article deteriorates. The accumulation of the resin can be improved by blending a mold release agent in the resin or subjecting the surface of the mold to mold release treatment. Meanwhile, the attachment of damages or the transformation of the concave-convex microstructure can be improved by enhancing abrasion resistance of the mold itself. However, there is limitation on improvement by using these methods. For this reason, when the mold outlives its usefulness, replacement with a new mold is necessary, and thus the cost easily becomes high.

The invention provides a method for producing a cylindrical nanoimprinting mold in which an outer peripheral surface of a cylindrical aluminum substrate is uniformly polished and the outer peripheral surface is more effectively utilized. In addition, the invention provides a method for producing a cylindrical nanoimprinting mold in which the transformation, such as whitening, of the outer peripheral surface of the aluminum substrate after polishing can be suppressed and high productivity can be obtained. Further, the invention provides a method for producing a nanoimprinting reproduction mold at low cost by reusing a used mold.

Means for Solving Problem

A method for producing a cylindrical nanoimprinting mold according to a first embodiment of the invention is a method for producing a cylindrical nanoimprinting mold in which an oxide film having a plurality of fine pores is formed on an outer peripheral surface of a cylindrical aluminum substrate, the method including: a step (I) of polishing the whole outer peripheral surface of the aluminum substrate by rubbing the outer peripheral surface of the aluminum substrate with a polishing body, which has a length along an axis direction of the aluminum substrate shorter than a length of the aluminum substrate in the axis direction, while relatively moving the polishing body and the aluminum substrate rotating around a central axis; and a step (II) of forming the oxide film on the outer peripheral surface of the aluminum substrate by anodization after the step (I), in which in the step (I), support members are disposed at both ends of the aluminum substrate in the central axis direction and polishing is performed by relatively moving the polishing body in the axis direction with respect to the outer peripheral surface of the aluminum substrate rotating around the axis such that at least a part of the polishing body protrudes beyond the end of the aluminum substrate in the axis direction, at least the part, which protrudes beyond the aluminum substrate, of the polishing body is disposed on the support member, and the shape obtained by cutting the surface of the portion, in which the polishing body is disposed, of the support member in a direction perpendicular to the axis direction of the aluminum substrate is an arc shape configuring at least a part of circumference having a diameter substantially equal to or less than the outer diameter of the aluminum substrate.

In the method for producing a cylindrical nanoimprinting mold according to the first embodiment of the invention, it is preferable that the outer shape of a portion, in which the polishing body is disposed, of the support member be a shape configuring at least a part of a cylindrical shape having an outer diameter 0.97 or more times but 1 or less times the outer diameter of the aluminum substrate. In addition, it is preferable that the outer shape of the support member be cylindrical.

Further, in the method for producing a cylindrical nanoimprinting mold according to the first embodiment of the invention, it is preferable that the portion, in which the polishing body is disposed, of the support member be made of the same material as that of the aluminum substrate.

Further, in the method for producing a cylindrical nanoimprinting mold according to the first embodiment of the invention, it is preferable that the method further include a step (I) of performing polishing by relatively moving the polishing body in the axis direction such that the polishing body does not protrude beyond the aluminum substrate, between the step (I) and the step (II).

Further, in the method for producing a cylindrical nanoimprinting mold according to the first embodiment of the invention, it is preferable that in the step (I), polishing be performed by the polishing body while supplying an abrasive grain to the outer peripheral surface of the aluminum substrate, and the residual abrasive grain remaining on the surface of the support member be removed.

Further, in the method for producing a cylindrical nanoimprinting mold according to the first embodiment of the invention, it is preferable that in the step (I), a polishing solution for chemical mechanical polishing be supplied to a contact portion with the polishing body in the outer peripheral surface of the aluminum substrate, and the outer peripheral surface of the aluminum substrate be washed at the rear side of the polishing body moving in the axis direction to remove the polishing solution.

Further, in the method for producing a cylindrical nanoimprinting mold according to the first embodiment of the invention, it is preferable that the polishing body be moved to one direction from a first end to a second end of the aluminum substrate in the axis direction.

Further, in the method for producing a cylindrical nanoimprinting mold according to the first embodiment of the invention, it is preferable that the outer peripheral surface of the aluminum substrate be further washed also at the front side of the polishing body moving in the axis direction to remove the polishing solution.

Further, in the method for producing a cylindrical nanoimprinting mold according to the first embodiment of the invention, it is preferable that a gas be blown at both sides of the polishing body in the axis direction to the outer peripheral surface of the aluminum substrate.

A method for producing a cylindrical nanoimprinting mold according to a second embodiment of the invention is a method for producing a cylindrical nanoimprinting mold in which an oxide film having a plurality of fine pores is formed on an outer peripheral surface of a cylindrical aluminum substrate, the method including: a step (I) of polishing the whole outer peripheral surface of the aluminum substrate by rubbing the outer peripheral surface of the aluminum substrate with a polishing body, which has a length along an axis direction of the aluminum substrate shorter than a length of the aluminum substrate in the axis direction, while relatively moving the polishing body and the aluminum substrate rotating around an axis; and a step (II) of forming the oxide film on the outer peripheral surface of the aluminum substrate by anodization after the step (I), in which in the step (I), a polishing solution for chemical mechanical polishing is supplied to a contact portion with the polishing body in the outer peripheral surface of the aluminum substrate, and the outer peripheral surface of the aluminum substrate is washed at the rear side of the polishing body moving in the axis direction to remove the polishing solution.

In the method for producing a cylindrical nanoimprinting mold according to the second embodiment of the invention, it is preferable that the polishing body be moved to one direction from a first end to a second end of the aluminum substrate in the axis direction.

Further, in the method for producing a cylindrical nanoimprinting mold according to the second embodiment of the invention, it is preferable that the outer peripheral surface of the aluminum substrate be further washed also at the front side of the polishing body moving in the axis direction to remove the polishing solution.

Further, in the method for producing a cylindrical nanoimprinting mold according to the second embodiment of the invention, it is preferable that a gas be blown at both sides of the polishing body in the axis direction to the outer peripheral surface of the aluminum substrate.

However, when a surface made of metal or the like is mirror-polished by mechanical processing using a blade such as cutting processing, it is known that an affected layer is formed on a processed surface. As a result of repeated intensive studies of the present inventors, the present inventors found that when anodization is performed after an oxide film or damages of the used mold are removed by mechanical processing, an oxide film having fine pores non-uniformly dispersed is easily formed. When a concave-convex microstructure is transferred onto a surface of an article main body by using the mold in a state where fine pores are non-uniformly dispersed, haze easily increases, and as a result, reflectance also increases. For this reason, it is necessary to remove an affected layer. However, time and effort is required until anodization is performed, and this leads to cost increase. Further, when an oxide film or damages of the used mold are removed by mechanical processing, since trace of mechanical processing such as cutting streaks may remain on a processed surface, it is also necessary to remove the trace of mechanical processing before anodization.

In this regard, when an oxide film or damages of the used mold are removed such that trace of mechanical processing or an affected layer is not formed, time and effort for removing the trace of mechanical processing or the affected layer is omitted, and further, an oxide film having fine pores uniformly dispersed is formed again by anodization. Based on this finding, the invention has been thus completed.

That is, the method for producing a nanoimprinting reproduction mold according to the invention is a method including: a polishing step of polishing a surface of a nanoimprinting mold in which an oxide film having a plurality of fine pores is formed on a surface of an aluminum substrate; and an oxide film forming step of forming again an oxide film, which has a plurality of fine pores on a surface of an aluminum substrate, by anodizing the polished surface.

Further, in the method for producing a nanoimprinting reproduction mold according to the invention, it is preferable that the polishing step include a treatment of chemically removing the oxide film having a plurality of fine pores on the surface of the nanoimprinting mold.

Further, in the method for producing a nanoimprinting reproduction mold according to the invention, it is preferable that the oxide film be chemically removed using a mixed solution of chromic acid and phosphoric acid.

Further, in the method for producing a nanoimprinting reproduction mold according to the invention, it is preferable that the method further include a resin removing step of removing a resin attached to the surface of the nanoimprinting mold having a plurality of fine pores on the surface thereof, before the polishing step.

Further, in the method for producing a nanoimprinting reproduction mold according to the invention, it is preferable that the aluminum substrate be subjected to chemical mechanical polishing after the oxide film is chemically removed in the polishing step.

Further, in the method for producing a nanoimprinting reproduction mold according to the invention, it is preferable that the outer shape of the aluminum substrate be cylindrical, the polishing step include a step (I) of polishing the whole outer peripheral surface of the aluminum substrate by rubbing the outer peripheral surface of the aluminum substrate with a polishing body, which has a length along an axis direction of the aluminum substrate shorter than a length of the aluminum substrate in the axis direction, while relatively moving the polishing body and the aluminum substrate rotating around a central axis, in the step (I), support members be disposed at both ends of the aluminum substrate in the central axis direction and polishing be performed by relatively moving the polishing body in the axis direction with respect to the outer peripheral surface of the aluminum substrate rotating around the axis such that at least a part of the polishing body protrudes beyond the end of the aluminum substrate in the axis direction, at least the part, which protrudes beyond the aluminum substrate, of the polishing body be disposed on the support member, and the shape obtained by cutting the surface of the portion, in which the polishing body is disposed, of the support member in a direction perpendicular to the axis direction of the aluminum substrate be an arc shape configuring at least a part of circumference having a diameter substantially equal to or less than the outer diameter of the aluminum substrate.

Further, in the method for producing a nanoimprinting reproduction mold according to the invention, it is preferable that the outer shape of a portion, in which the polishing body is disposed, of the support member be a shape configuring at least a part of a cylindrical shape having an outer diameter 0.97 or more times but 1 or less times the outer diameter of the aluminum substrate.

Further, in the method for producing a nanoimprinting reproduction mold according to the invention, it is preferable that the polishing step further include a step (I') of performing polishing by relatively moving the polishing body in the axis direction such that the polishing body does not protrude beyond the aluminum substrate, after the step (I).

Further, in the method for producing a nanoimprinting reproduction mold according to the invention, it is preferable that in the step (I), a polishing solution for chemical mechanical polishing be supplied to a contact portion with the polishing body in the outer peripheral surface of the aluminum substrate, and the outer peripheral surface of the aluminum substrate be washed at the rear side of the polishing body moving in the axis direction to remove the polishing solution.

Further, in the method for producing a nanoimprinting reproduction mold according to the invention, it is preferable that the polishing body be moved to one direction from a first end to a second end of the aluminum substrate in the axis direction.

Further, in the method for producing a nanoimprinting reproduction mold according to the invention, it is preferable that the outer peripheral surface of the aluminum substrate be further washed also at the front side of the polishing body moving in the axis direction to remove the polishing solution.

Further, in the method for producing a nanoimprinting reproduction mold according to the invention, it is preferable that a gas be blown at both sides of the polishing body in the axis direction to the outer peripheral surface of the aluminum substrate.

Effect of the Invention

According to the method for producing a cylindrical nanoimprinting mold of the invention, the outer peripheral surface of the cylindrical aluminum substrate is uniformly polished, and thus it is possible to produce a cylindrical nanoimprinting mold in which the outer peripheral surface can be more effectively utilized.

Further, according to the method for producing a cylindrical nanoimprinting mold of the invention, the transformation, such as whitening, of the outer peripheral surface of the aluminum substrate after primary CMP polishing using an acidic CMP slurry can be suppressed, and thus a nanoimprinting mold can be produced with high productivity.

Further, according to the method for producing a nanoimprinting reproduction mold of the invention, a nanoimprinting reproduction mold can be produced at low cost by reusing a used mold.

MODE(S) FOR CARRYING OUT THE INVENTION

In this specification, the term "fine pores" indicates concave portions of a concave-convex microstructure which is formed on an oxide film of a surface of an aluminum substrate.

The term "interval between fine pores" means a distance between centers of adjacent fine pores.

The term "cylindrical" means a cylindrical shape as a whole, and a hollow cylindrical shape such as a circular cylindrical shape and a shape in which a plurality of through holes are formed are also included in a cylindrical shape.

The term "protrusions" indicates convex portions of a concave-convex microstructure formed on a surface of a molded body.

The term "concave-convex microstructure" means a structure in which an average interval between convex portions or concave portions is 10 to 400 nm.

The term "mechanical polishing" means that a processed surface is physically polished so as to be mirror-polished. In the invention, physical polishing also includes "tape polishing" and "chemical mechanical polishing (CMP polishing)."

The term "polishing rate" indicates a polishing amount per unit time.

The expression "finishing the surface" means that the surface of the aluminum substrate is mirror-polished until the arithmetic mean roughness becomes 15 nm or less.

Method for Producing Cylindrical Nanoimprinting Mold

First Embodiment

A method for producing a cylindrical nanoimprinting mold (hereinafter, simply referred to as a "mold") according to a first embodiment of the invention is a method for producing a mold in which an oxide film having a plurality of fine pores is formed on an outer peripheral surface of a cylindrical aluminum substrate.

Hereinafter, an example of the method for producing a mold according to the first embodiment of the invention will be described. The method for producing a mold according to this embodiment includes the following step (I) and step (II).

Figure 1:
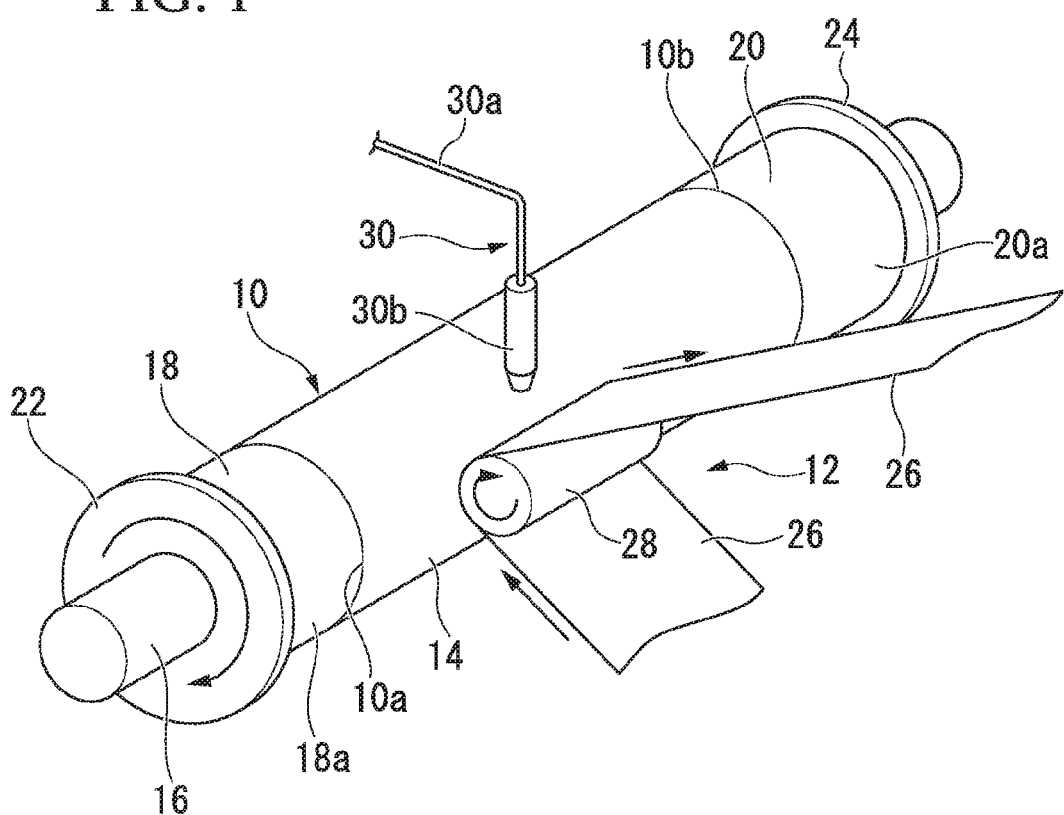
FIG. 1 is a perspective view illustrating an example of a step (I) in a producing method according to a first embodiment of the invention.
Figure 2:
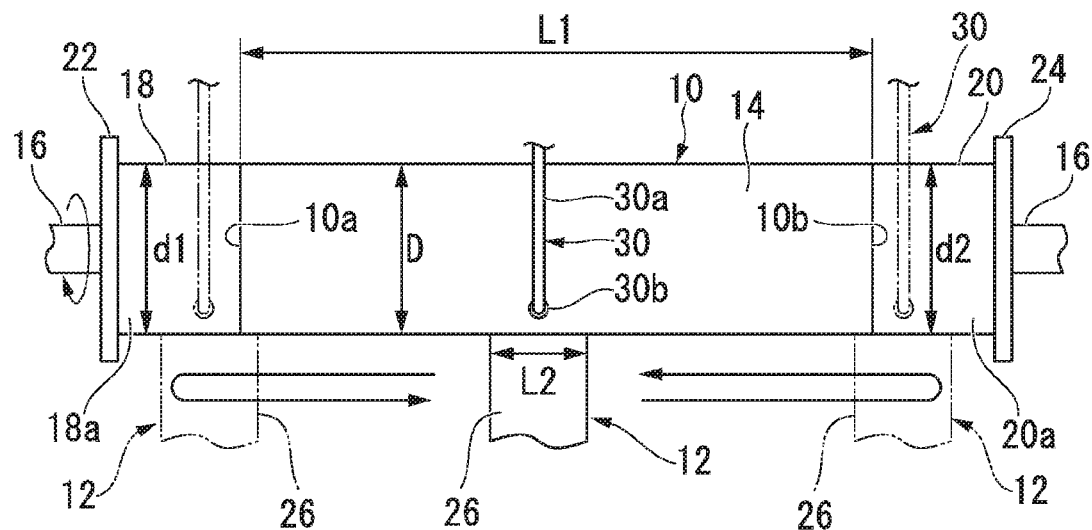
FIG. 2 is a plan view of the step (I) illustrated in FIG. 1.

(I) As illustrated in FIG. 1 and FIG. 2, the whole outer peripheral surface 14 of an aluminum substrate 10 by rubbing the outer peripheral surface 14 of the aluminum substrate 10 with a polishing body 26, which has a length L2 along an axis direction of the cylindrical aluminum substrate 10 is shorter than a length L1 of the aluminum substrate 10 in the axis direction, while relatively moving the polishing body 26 and the aluminum substrate 10 rotating around a central axis.

(II) An oxide film having a plurality of fine pores on the outer peripheral surface 14 of the aluminum substrate 10 by anodization after the step (I).

Further, the producing method according to the first embodiment of the invention may further include the following step (I') as necessary.

(I') Between the step (I) and the step (II), polishing is performed by relatively moving the polishing body 26 in the axis direction such that the polishing body 26 does not protrude beyond the aluminum substrate 10.

<Step (I)>

In the step (I) in this example, the cylindrical aluminum substrate 10 is disposed at a rotation axis 16. Further, a first support member 18 is disposed at a first end 10a side in the axis direction of aluminum substrate 10 in the rotation axis 16, and a second support member 20 is further disposed at a second end 10b in the axis direction of aluminum substrate 10 in the rotation axis 16. The first support member 18 is disposed close to the first end 10a of the aluminum substrate 10. The second support member 20 is disposed close to the second end 10b of the aluminum substrate 10.

Further, disk-shaped stoppers 22 and 24 are disposed at the outer sides of the first support member 18 of the second support member 20 in the rotation axis 16, respectively.

The outer shapes of the first support member 18 and the second support member 20 in this example are cylindrical. The first support member 18 and the second support member 20 are configured to rotate simultaneously when the aluminum substrate 10 is rotated around the axis by the rotation axis 16.

Further, an outer diameter d1 (FIG. 2) of the first support member 18 and an outer diameter d2 (FIG. 2) of the second support member 20 are the same as an outer diameter D (FIG. 2) of the aluminum substrate 10. According to this, when the polishing body 26 is protruded at the first end 10a side and the second end 10b side as described later, at least a part of the protruding portion of polishing body 26 is disposed on the first support member 18 and the second support member 20 and supported by the first support member and the second support member.

In this way, the shape obtained by cutting an outer peripheral surface 18a that is the surface of the portion, in which the polishing body 26 is disposed, of the first support member 18 in this example in a direction perpendicular to the axis direction is a circular shape configuring the whole of circumference having a diameter equal to the outer diameter D of the aluminum substrate 10. Similarly, the shape obtained by cutting an outer peripheral surface 20a that is the surface of the portion, in which the polishing body 26 is disposed, of second support member 20 in this example in a direction perpendicular to the axis direction is a circular shape configuring the whole of circumference having a diameter equal to the outer diameter D of the aluminum substrate 10.

The polishing means 12 includes a belt-shaped polishing body 26, a conveyance roll 28 conveying the polishing body 26 to the longitudinal direction thereof, and a polishing solution supplying means 30 supplying a polishing solution.

In the polishing body 26, the length L2 (FIG. 2) along the axis direction of the aluminum substrate 10 is shorter than the length L1 (FIG. 2) of the aluminum substrate 10 in the axis direction.

The polishing body 26 is not limited as long as it can polish the surface of the aluminum substrate to a desired state, and examples thereof include polishing pads of a non-woven type or a suede type. Further, as the polishing body 26, polishing paper in which SiC powder is embedded with permanent paper, a polishing disk in which diamond powder is embedded with metal, or the like may be used.

The conveyance roll 28 is configured to convey the polishing body 26 in the longitudinal direction thereof while the polishing body 26 is pressed against the outer peripheral surface 14 of the aluminum substrate 10.

In this example, the polishing body 26 is conveyed by the conveyance roll 28 in the portion at which the outer peripheral surface 14 and polishing body 26 are contacted to each other such that the rotation direction of the aluminum substrate 10 and the direction in which the polishing body 26 is conveyed are opposite to each other.

The polishing solution supplying means 30 includes a pipe 30a sending a polishing solution and a nozzle 30b provided at the tip end of the pipe 30a. The polishing solution supplying means 30 is disposed to supply a polishing solution between the outer peripheral surface 14 of the aluminum substrate 10 and the polishing body 26.

A polishing solution used for polishing may be appropriately selected depending on various objects, for example, an object to mirror-polish the outer peripheral surface 14 of the aluminum substrate 10, and a well-known polishing solution used when a surface of aluminum is polished can be used.

Examples of the polishing solution include a slurry containing an abrasive grain such as SiC, $Al_2O_3$, or $SiO_2$, $ZrO_2$, and a polishing solution (CMP slurry) for chemical mechanical polishing (CMP) in which an abrasive grain is dispersed in an acidic or alkaline solution having an effect of corroding aluminum. Among them, from the viewpoint of polishing efficiency, an acidic CMP slurry is preferable in a case where the outer peripheral surface 14 of the aluminum substrate 10 is in a state of a coarse surface by mechanical processing, and an alkaline CMP slurry is preferable in a case where the outer peripheral surface is finished to be mirror-polished.

The polishing means 12 can move in the axis direction of the aluminum substrate 10. That is, the whole outer peripheral surface 14 from the first end 10a to the second end 10b of the aluminum substrate 10 can be polished by moving the polishing body 26 pressed against the outer peripheral surface 14 of the aluminum substrate 10 in the axis direction of the aluminum substrate 10.

In the step (I), the whole outer peripheral surface 14 of the aluminum substrate 10 is polished by moving the polishing body 26 in the axis direction while the polishing body 26 is pressed against the outer peripheral surface 14 of the aluminum substrate 10 so as to be rubbed by rotating the aluminum substrate 10 around the axis. At this time, in the first end 10a side and the second end 10b side of the aluminum substrate 10, the polishing body 26 is moved such that at least a part of the polishing body 26 protrudes beyond the aluminum substrate 10.

Figure 3:
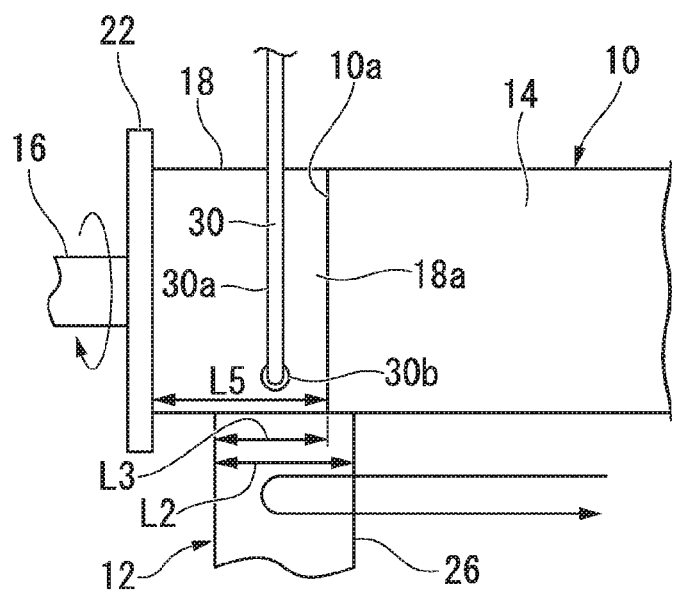
FIG. 3 is an enlarged view of the vicinity of a first end of an aluminum substrate in FIG. 2.

Specifically, as illustrated in FIG. 3, when the polishing body 26, which has been moved on the outer peripheral surface 14 of the aluminum substrate 10 toward the first end 10a in the axis direction, is retracted to the second end 10b side, at least a part of the polishing body 26 is protruded once beyond the first end 10a of the aluminum substrate 10. That is, when the polishing body 26 is retracted at the first end 10a side of the aluminum substrate 10, the polishing body 26 is allowed to overrun the first end 10a of the aluminum substrate.

Herein, when the portion, which protrudes beyond the first end 10a of the aluminum substrate 10, of the polishing body 26 is disposed on the outer peripheral surface 18a of the first support member 18, the portion comes into contact with the outer peripheral surface 18a of the first support member 18. In this example, the first support member 18 rotates around the axis together with the aluminum substrate 10. Therefore, when the portion of the polishing body 26 protruding beyond the aluminum substrate 10 is pressed and rubbed, the outer peripheral surface 18a of the first support member 18 is also polished together with the outer peripheral surface 14 of the aluminum substrate 10.

Figure 4:
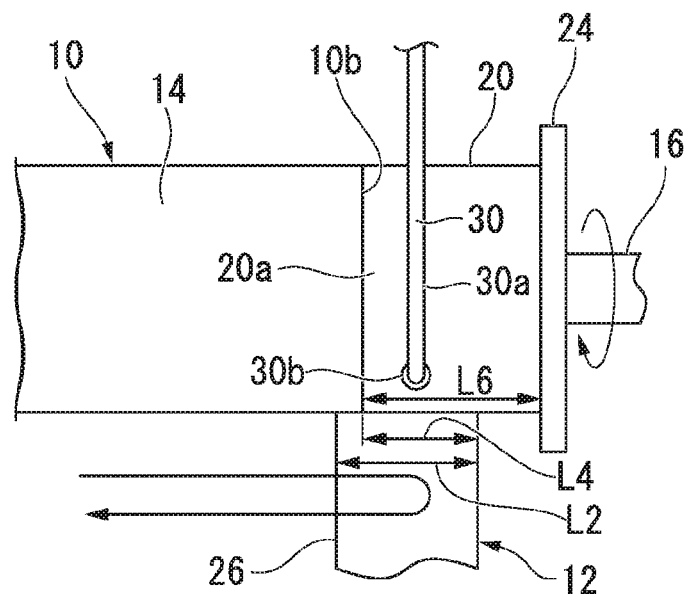
FIG. 4 is an enlarged view of the vicinity of a second end of the aluminum substrate in FIG. 2.

Similarly, as illustrated in FIG. 4, when the polishing body 26, which has been moved on the outer peripheral surface 14 of the aluminum substrate 10 toward the second end 10b in the axis direction, is retracted to the first end 10a side, at least a part of the polishing body 26 is protruded once beyond the second end 10b. That is, when the polishing body 26 is retracted at the second end 10b of the aluminum substrate 10, the polishing body 26 is allowed to overrun the second end 10b of the aluminum substrate 10.

Herein, when the portion, which protrudes beyond the second end 10b of the aluminum substrate 10, of the polishing body 26 is disposed on the outer peripheral surface 20a of the second support member 20, the portion comes into contact with the outer peripheral surface 20a of the second support member 20. In this example, the second support member 20 also rotates around the axis together with the aluminum substrate 10. Therefore, the outer peripheral surface 20a of the second support member 20 is also polished by the polishing body 26.

In the step (I) of this embodiment, when the polishing body 26 is moved in the axis direction of the aluminum substrate 10 in this way, the polishing body 26 is reciprocated such that at least a part of the polishing body 26 is protruded at the first end 10a side and the second end 10b side, respectively. According to this, a difference between the polishing time in the vicinity of the first end 10a and the vicinity of the second end 10b of the aluminum substrate 10 and the polishing time in the center portion decreases. Therefore, it is possible to obtain the aluminum substrate 10 which has favorable uniformity in the surface roughness of the outer peripheral surface 14 from the first end 10a to the second end 10b.

A ratio (L3/L2) of a length L3 (FIG. 3) of the portion, which is protruded at the first end 10a side of the polishing body 26, along the axis direction of the aluminum substrate 10 to the length L2 of the polishing body 26 along the axis direction of the aluminum substrate 10 is preferably 0.4 or more and more preferably 0.5 or more. When L3/L2 is equal to or more the lower limit, a difference in the polishing time between the vicinity of the first end 10a of the aluminum substrate 10 and the center portion further decreases, and thus the surface roughness of the outer peripheral surface 14 becomes more uniform.

The upper limit of L3/L2 is 1. That L3/L2 is 1 means that the polishing body 26 completely protrudes at the first support member 18 side in the first end 10a side of the aluminum substrate 10. When L3/L2 is 1, since the difference in the polishing time between the vicinity of the first end 10a of the aluminum substrate 10 and the center portion can be eliminated, the surface roughness of the outer peripheral surface 14 becomes more uniform.

Further, when the first support member 18 is continuously used without replacement at the time of polishing the outer peripheral surfaces 14 of a plurality of the aluminum substrates 10, since the outer peripheral surface 18a of the first support member 18 is continuously polished, the outer diameter d1 of the first support member 18 may be smaller than the outer diameter D of the aluminum substrate 10. In this case, the outer peripheral surface 18a of the first support member 18 becomes lower than the outer peripheral surface 14 of the aluminum substrate 10 and thus a level difference is generated. In this state, when the polishing body 26 is completely protruded at the first end 10a side of the aluminum substrate 10, there is a concern that the polishing body 26 may be caught in the level difference portion between the first support member 18 and the aluminum substrate 10 when the polishing body 26 is retracted.

For this reason, when the first support member 18 is continuously used, L3/L2 is preferably 0.9 or less and 0.8 or less. According to this, the polishing body 26, in which a part is protruded at the first end 10a side of the aluminum substrate 10, can be stably and more smoothly retracted.

The preferred aspect of the protruding ratio of the polishing body 26 at the second end 10b side of the aluminum substrate 10 is also the same as at the first end 10a side of the aluminum substrate 10. That is, a ratio (L4/L2) of a length L4 (FIG. 4) of the portion, which is protruded at the second end 10b side, of the polishing body 26 along the axis direction of the aluminum substrate 10 to the length L2 (FIG. 4) of the polishing body 26 along the axis direction of the aluminum substrate 10 is preferably 0.4 or more and more preferably 0.5 or more. When L4/L2 is equal to or more the lower limit, a difference in the polishing time between the vicinity of the second end 10b of the aluminum substrate 10 and the center portion further decreases, and thus the surface roughness of the outer peripheral surface 14 becomes more uniform.

The upper limit of L4/L2 is 1. That L4/L2 is 1 means that the polishing body 26 completely protrudes at the first support member 18 side in the second end 10b side of the aluminum substrate 10. When L4/L2 is 1, since the difference in the polishing time between the vicinity of the second end 10b of the aluminum substrate 10 and the center portion can be eliminated, the surface roughness of the outer peripheral surface 14 becomes more uniform.

Further, when the second support member 20 is continuously used, similarly to the case of the first support member 18, the outer diameter d2 of the second support member 20 may be smaller than the outer diameter D of the aluminum substrate 10. In this case, L4/L2 is preferably 0.9 or less and more preferably 0.8 or less. According to this, it is possible to suppress that the polishing body 26 is caught in the level difference portion in the boundary between the second support member 20 and the aluminum substrate 10 when the polishing body 26, in which a part is protruded at the second end 10b side of the aluminum substrate 10, is retracted. Therefore, the polishing body 26 can be stably and more smoothly retracted.

The purity of aluminum of the aluminum substrate 10 is preferably 99.5% by mass or more and more preferably 99.9% by mass or more. When the purity of aluminum is equal to or more than the lower limit, fine pores with high regularity can be formed with higher accuracy in the step (II).

When aluminum with high purity is used in the aluminum substrate 10, the aluminum substrate may be too soft to be processed at the time of processing the aluminum substrate in a cylindrical shape. In this case, those obtained by adding magnesium in aluminum and then processed in a cylindrical shape may be used as the aluminum substrate 10. When magnesium is added, the strength of aluminum increases, and thus the aluminum substrate is easily processed.

When magnesium is added to aluminum, the added amount of magnesium is preferably 0.05 to 3% by mass with respect to the total mass of the aluminum substrate 10.

As described in this example, when the first support member 18 is formed in a cylindrical shape and the outer peripheral surface 18a of the first support member 18 is polished together with the outer peripheral surface 14 of the aluminum substrate 10, the material of the first support member 18 is preferably the same as the material of the aluminum substrate 10. That is, the material of the portion, in which the polishing body 26 is disposed, of the first support member 18 is preferably the same as the material of the aluminum substrate. When there is a portion, in which the polishing body 26 is not disposed, in the first support member 18, the material of the portion may be the same as or different from the material of the aluminum substrate 10.

According to this, it is possible to suppress that shavings harder than the aluminum substrate 10 are generated from the first support member 18. For this reason, it is possible to easily suppress that the shavings harder than the aluminum substrate 10 enter a gap between the polishing body 26 and the outer peripheral surface 14 of the aluminum substrate 10 to damage the outer peripheral surface 14.

Further, if the material of the first support member 18 is the same as the material of the aluminum substrate 10, corrosive properties of the first support member 18 and the aluminum substrate 10 become substantially the same even when chemical mechanical polishing (CMP) is performed. According to this, the first support member 18 and the aluminum substrate 10 are polished to the same degree during chemical mechanical polishing, and thus the level difference is less likely to occur. For this reason, it is easy to polish the vicinity of the first end 10a of the aluminum substrate 10 at the same degree as in the center portion in the axis direction.

Also in a case where the second support member 20 is formed in a cylindrical shape and the outer peripheral surface 20a of the second support member 20 is polished together with the outer peripheral surface 14 of the aluminum substrate 10, from the same reason in the case of the first support member 18, the material of the second support member 20 is preferably the same as the material of the aluminum substrate 10. That is, the material of the portion, in which the polishing body 26 is disposed, of the second support member 20 is preferably the same as the material of the aluminum substrate. When there is a portion, in which the polishing body 26 is not disposed, in the second support member 20, the material of the portion may be the same as or different from the material of the aluminum substrate 10.

Incidentally, the materials of the portions, at which the polishing body 26 is disposed, of the first support member 18 and the second support member 20 are not necessary to be completely the same as the material of the aluminum substrate 10, and may be the same to the extent that the hardness or the degree of polishing is not extremely different. For the first support member 18 and the second support member 20, at least the surface thereof are preferably formed by aluminum with a purity of 99.5% by mass or more, and more preferably formed by aluminum with a purity of 99.9% by mass or more. Further, 0.05% by mass to 3% by mass of magnesium may be added.

Although the outer diameter d1 of the first support member 18 is equal to the outer diameter D of the aluminum substrate 10 in this example, the outer diameter d1 of the first support member 18 may be different from the outer diameter D of the aluminum substrate 10 in the invention. Similarly, in the invention, the outer diameter d2 of the second support member 20 may be different from the outer diameter D of the aluminum substrate 10. Also in this case, the outer diameter d1 of the first support member 18 and the outer diameter d2 of the second support member 20 are preferably substantially equal to or less than the outer diameter D of the aluminum substrate 10.

Figure 5:
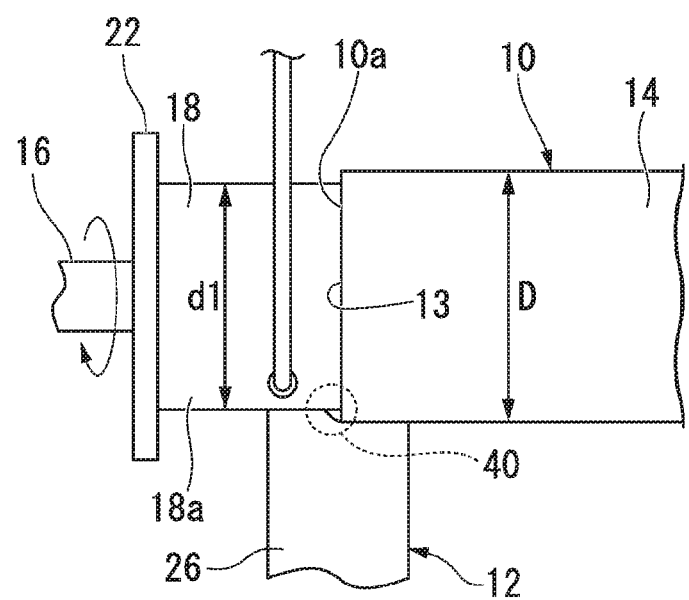
FIG. 5 is an enlarged view of the vicinity of the first end of the aluminum substrate when the outer diameter of a first support member is smaller than the outer diameter of the aluminum substrate.

When the outer diameter d1 of the first support member 18 is smaller than the outer diameter D of the aluminum substrate 10, as illustrated in FIG. 5, the polishing body 26 is transformed toward the center axis of the aluminum substrate 10 such that the polishing body 26 is covered with a side end surface 13 at the first end 10a of the aluminum substrate 10. At this time, a large polishing pressure is easily applied locally to the first end 10a of the aluminum substrate 10 by the polishing body 26. In this way, when a relatively larger polishing pressure is applied to the first end 10a of the aluminum substrate 10 as compared with the center portion of the axis direction, the first end 10a is excessively polished and thus there is a concern that the surface roughness may become non-uniform.

For this reason, when the outer diameter d1 of the first support member 18 is smaller than the outer diameter D of the aluminum substrate 10, it is preferable that the outer diameter d1 of the first support member 18 be as close as possible to the outer diameter D of the aluminum substrate 10. In addition, it is more preferable that the outer diameter d1 of the first support member 18 be equal to or less than the outer diameter D of the aluminum substrate 10.

Figure 6:
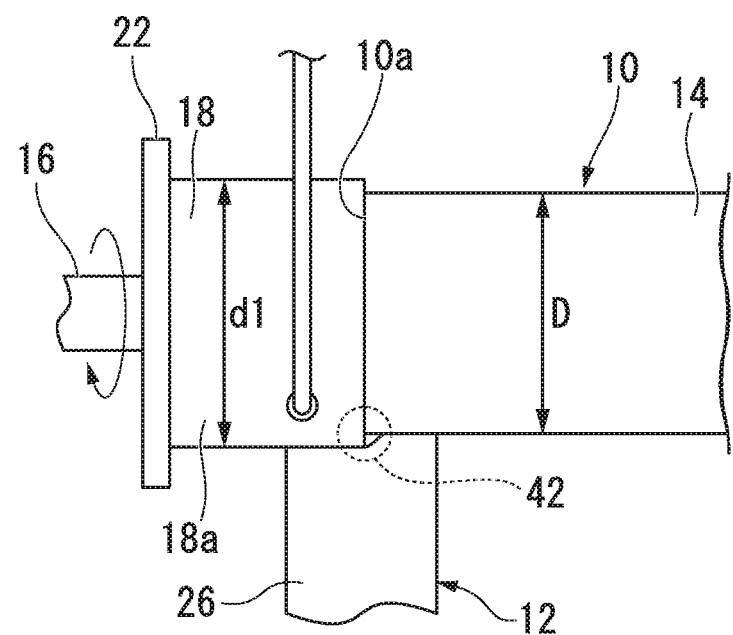
FIG. 6 is an enlarged view of the vicinity of the first end of the aluminum substrate when the outer diameter of the aluminum substrate is smaller than the outer diameter of the first support member.

Further, when the outer diameter d1 of the first support member 18 is too larger than the outer diameter D of the aluminum substrate 10, as illustrated in FIG. 6, there is a concern that the polishing body 26 is difficult to come into contact with the first end 10a of the aluminum substrate 10 when the polishing body 26 is put on the first support member 18. Further, when the polishing body 26 is put on the first support member 18, there is a concern that damage or twist may occur in the polishing body 26 itself or overload may occur in the polishing means 12. For this reason, the outer diameter d1 of the first support member 18 is preferably smaller than the outer diameter D of the aluminum substrate 10. however, when the outer diameter d1 of the first support member 18 is larger than the outer diameter D of the aluminum substrate 10, a level difference amount ($\{d1-D\}\div 2$) of the outer peripheral surface 14 of the aluminum substrate 10 and the outer peripheral surface 18a of the first support member 18 is set to be preferably equal to or less than the thickness of the polishing body 26.

A ratio (d1/D) of the outer diameter d1 of the first support member 18 to the outer diameter D of the aluminum substrate 10 is preferably 0.97 to 1 and more preferably 0.99 to 1, from the above-described reason. When d1/D is within the above range, it is easy to form the outer peripheral surface 14 having uniform surface roughness by polishing.

A length L5 (FIG. 3) of the first support member 18 in the axis direction is preferably equal to or more than the length L2 (FIG. 3) of the polishing body 26 in the axis direction. According to this, even when the polishing body 26 is completely protruded beyond the aluminum substrate 10 at the first end 10a side of the aluminum substrate 10, it is difficult to damage the polishing body 26 since the whole polishing body 26 is supported by the first support member 18.

Further, the preferred aspect of the outer diameter d2 of the second support member 20 is the same as the preferred aspect of the outer diameter d1 of the first support member 18.

Specifically, when the outer diameter d2 of the second support member 20 is smaller than the outer diameter D of the aluminum substrate 10, it is preferable that the outer diameter d2 of the second support member 20 be as close as possible to the outer diameter D of the aluminum substrate 10. In addition, it is more preferable that the outer diameter d2 of the second support member 20 be equal to or less than the outer diameter D of the aluminum substrate 10. Further, also in a case where the outer diameter d2 of the second support member 20 is larger than the outer diameter D of the aluminum substrate 10, it is preferable that the outer diameter d2 of the second support member 20 be as close as possible to the outer diameter D of the aluminum substrate 10.

Further, a ratio (d2/D) of the outer diameter d2 of the second support member 20 to the outer diameter D of the aluminum substrate 10 is preferably 0.97 to 1 and more preferably 0.99 to 1.

Further, a length L6 (FIG. 4) of the second support member 20 in the axis direction is preferably equal to or more than the length L2 (FIG. 3) of the polishing body 26 in the axis direction. According to this, even when the polishing body 26 is completely protruded beyond the aluminum substrate 10 at the second end 10b side of the aluminum substrate 10, it is difficult to damage the polishing body 26 since the whole polishing body 26 is supported by the second support member 20.

The shapes of the stoppers 22 and 24 are not limited to a disk shape, and any shape may be employed as long as it can maintain a state where the first support member 18 and the second support member 20 are disposed at the both ends of the aluminum substrate 10.

Further, the sizes of the stoppers 22 and 24 are not limited to the sizes larger than the aluminum substrate 10, the first support member 18, and the second support member 20, and the sizes may be within the range that can maintain a state where the first support member 18 and the second support member 20 are disposed at the both ends of the aluminum substrate 10.

Further, the materials of the stoppers 22 and 24 preferably have corrosion resistance to a polishing solution having a corrosive property, and for example, stainless steel; a resin such as polyvinyl chloride (PVC) or polypropylene (PP); and the like are exemplified.

The movement speed of the polishing body 26 along the axis direction of the aluminum substrate 10 is set to be preferably constant. According to this, it is easy to set the polishing time for outer peripheral surface 14 of the aluminum substrate 10 in the axis direction to be constant from the first end 10a to the second end 10b, and thus the surface roughness of the outer peripheral surface 14 of the aluminum substrate 10 is easily set to be constant. Incidentally, the movement speed of the polishing body 26 along the axis direction may be changed within the range not impairing the effect of the invention.

The number of times at which the polishing body 26 is reciprocated in the axis direction on the outer peripheral surface 14 of the aluminum substrate 10 may be appropriately set depending on conditions such as a target surface roughness, and may be 1 or 2 or more.

Further, in the step (I), polishing may be performed while a polishing solution attached to a portion, through which the polishing body 26 passes, in the outer peripheral surface 14 of the aluminum substrate 10, is washed and removed. According to this, it is possible to easily suppress that a problem arises in that corrosion occurs in the polished portion in the outer peripheral surface 14 of the aluminum substrate 10 due to the polishing solution, for example.

The outer peripheral surface 14 of the aluminum substrate 10 after polishing in the step (I) is preferably mirror-polished.

In the step (I), after polishing, minute polishing flaws (scratches) may remain on the outer peripheral surface 14 of the aluminum substrate 10 in some cases. The reason why the polishing flaws occur is as follows.

As illustrated in FIG. 5, if the outer diameter D of the aluminum substrate 10 is larger than the outer diameter d1 of the first support member 18, when the polishing body 26 overruns the first end 10a or the second end 10b, the first support member 18 and the polishing body 26 are separated from each other at the level difference portion between the first support member 18 and the aluminum substrate 10 to thereby generate a gap 40. In the gap 40, abrasive grain fractions of the polishing solution may keep remaining during polishing, and thus residual abrasive grains may be aggregated so as to be aggregated abrasive grains much larger than typical abrasive grains in some cases. Further, the aggregated abrasive grains overrun and are caught in the polishing body 26 when the polishing body 26 coming into contact with the first support member 18 return on the aluminum substrate 10, and thus the aggregated abrasive grains may be carried onto the aluminum substrate 10 in some cases. When the aggregated abrasive grains are carried onto the aluminum substrate 10, polishing flaws may occur in the outer peripheral surface 14 of the aluminum substrate 10 by the aggregated abrasive grains in some cases.

As illustrated in FIG. 6, even in a case where the outer diameter D of the aluminum substrate 10 is smaller than the outer diameter d1 of the first support member 18, when the polishing body 26 overruns the first end 10a or the second end 10b, the aluminum substrate 10 and the polishing body 26 are separated from each other to thereby generate a gap 42. For this reason, similarly, in this case, aggregated abrasive grains occur in the gap 42, and thus polishing flaws may occur in the outer peripheral surface 14 of the aluminum substrate 10 by the aggregated abrasive grains in some cases.

Figure 14:
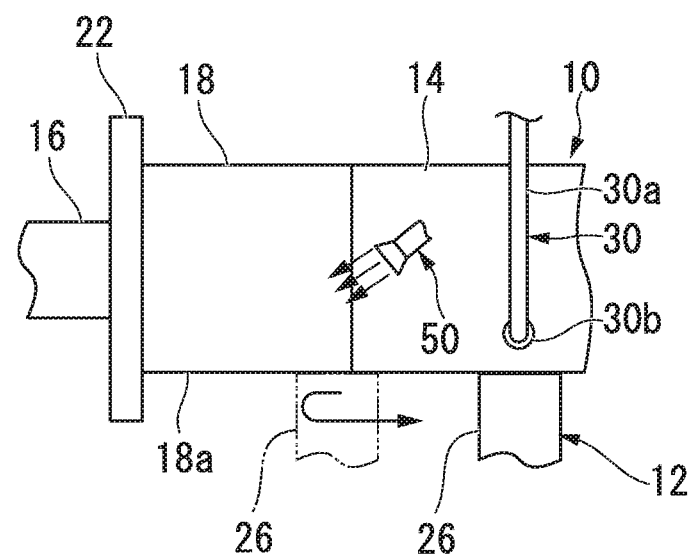
FIG. 14 is a plan view illustrating still another aspect of the step (I) in the producing method according to the first embodiment of the invention.

For this reason, in the step (1), as illustrated in FIG. 14, when the polishing body 26 overrun to the first support member 18 return on the aluminum substrate 10, the aggregated abrasive grains remaining on the surface of the first support member 18 may be removed by using a residual abrasive grain removing means 50. According to this, it is possible to suppress that the residual abrasive grains remain in the gaps 40 and 42. As a result, the occurrence of polishing flaws can be lowered.

The residual abrasive grain removing means 50 is not particularly limited, and examples thereof include a means for removing residual abrasive grains through washing or suctioning using a fluid such as water, a cleanser, or air, a contact-type removing means such as a sponge, and a means obtained by combining these means.

For washing using water, since the aggregation of abrasive grain fractions may be promoted by a change in concentration of a polishing solution on the surface of the first support member 18 depending on a polishing solution to be used, it is preferable to select a most suitable means according to a polishing solution to be used.

The same also applies to the second end 10b side of the aluminum substrate 10, and aggregated abrasive grains remaining on the surface of the second support member 20 may be removed by using the residual abrasive grain removing means 50 when the polishing body 26 overrun to the second support member 20 returns on the aluminum substrate 10.

<Step (I')>

In a case where minute polishing flaws (scratches) remain on the outer peripheral surface 14 after uniformly polishing the whole outer peripheral surface 14 of the aluminum substrate 10 in the step (I), it is necessary to perform additional polishing in order to remove the polishing flaws and make the outer peripheral surface favorable. In this case, it is preferable to switch the process from the step (I) to the step (I') of performing polishing by moving the polishing body 26 in the axis direction such that the polishing body 26 does not protrude beyond the aluminum substrate 10.

Incidentally, if minute polishing flaws do not occur in the outer peripheral surface 14 in a state where the whole outer peripheral surface 14 of the aluminum substrate 10 is mirror-polished in the step (I), it is not necessary to perform the step (I').

Figure 13:
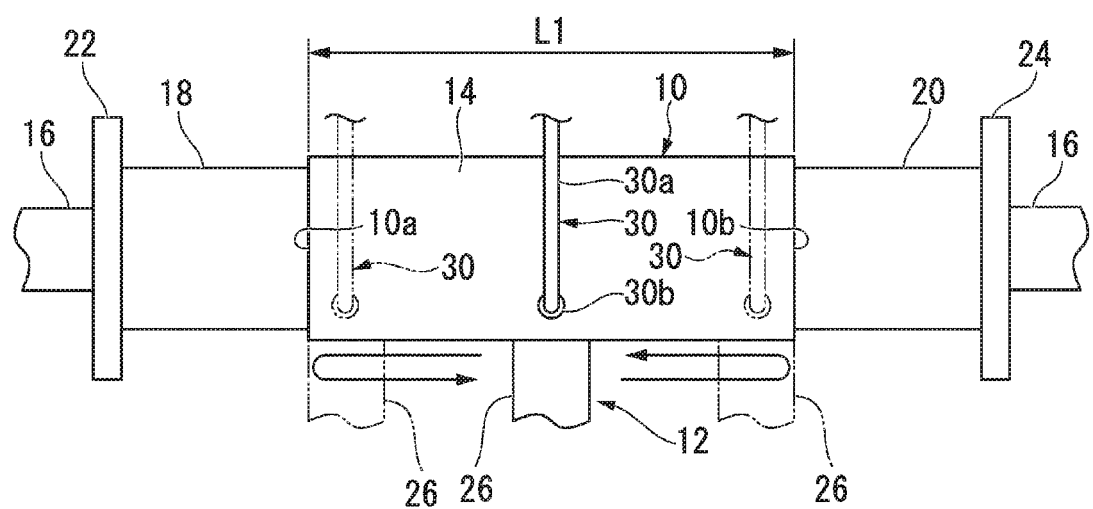
FIG. 13 is a plan view illustrating an example of a step (I') in the producing method according to the first embodiment of the invention.

In the step (I'), as illustrated in FIG. 13, the reciprocation of the polishing body 26 in the axis direction is set within the length L1 of the aluminum substrate 10, and polishing is performed such that the polishing body 26 does not protrude beyond the first end 10a and the second end 10b, that is, does not overrun. When polishing is performed without the polishing body 26 overrunning, the gaps 40 and 42 described above are not generated at the level difference portion between the aluminum substrate 10 and the first support member 18. According to this, the aggregated abrasive grains are not generated, and thus polishing flaws do not occur newly when the additional polishing is performed in the step (I) and the surface can be polished to be in a favorable mirror-polished state.

In the step (I'), polishing can be performed under the same conditions as in the step (I), except that the range of the reciprocation of the polishing body 26 along the axis direction of the aluminum substrate 10.

Further, from the viewpoint of efficiently suppressing the occurrence of polishing flaws, in the step (I) and the step (P), it is preferable to provide a filter for filtering foreign substances in the middle of the pipe 30a supplying a polishing solution. For the type of a filter, most suitable filters may be selected on the basis of the abrasive grain size of a polishing solution, the resistance to a polishing solution having a corrosive property, and allowable size of polishing flaws.

<Washing of Polishing Solution>

In a case where an acidic or alkaline CMP slurry is used as a polishing solution in the step (I), when the CMP slurry stays in the outer peripheral surface 14 of the aluminum substrate 10 for a long time, in some cases, a phenomenon may occur in which the outer peripheral surface 14 of the aluminum substrate 10 is transformed to become white and polishing is difficult to proceed. In such a case, it is preferable to remove a polishing solution present on a portion, which is not polished, of the outer peripheral surface 14 of the aluminum substrate 10. Also in the step (I'), when a CMP slurry is used, similarly, it is preferable to remove a polishing solution. Specifically, it is preferable to remove a polishing solution at the rear side of the polishing body moving in the axis direction or at both sides of the rear side and the front side of the polishing body.

Figure 15:
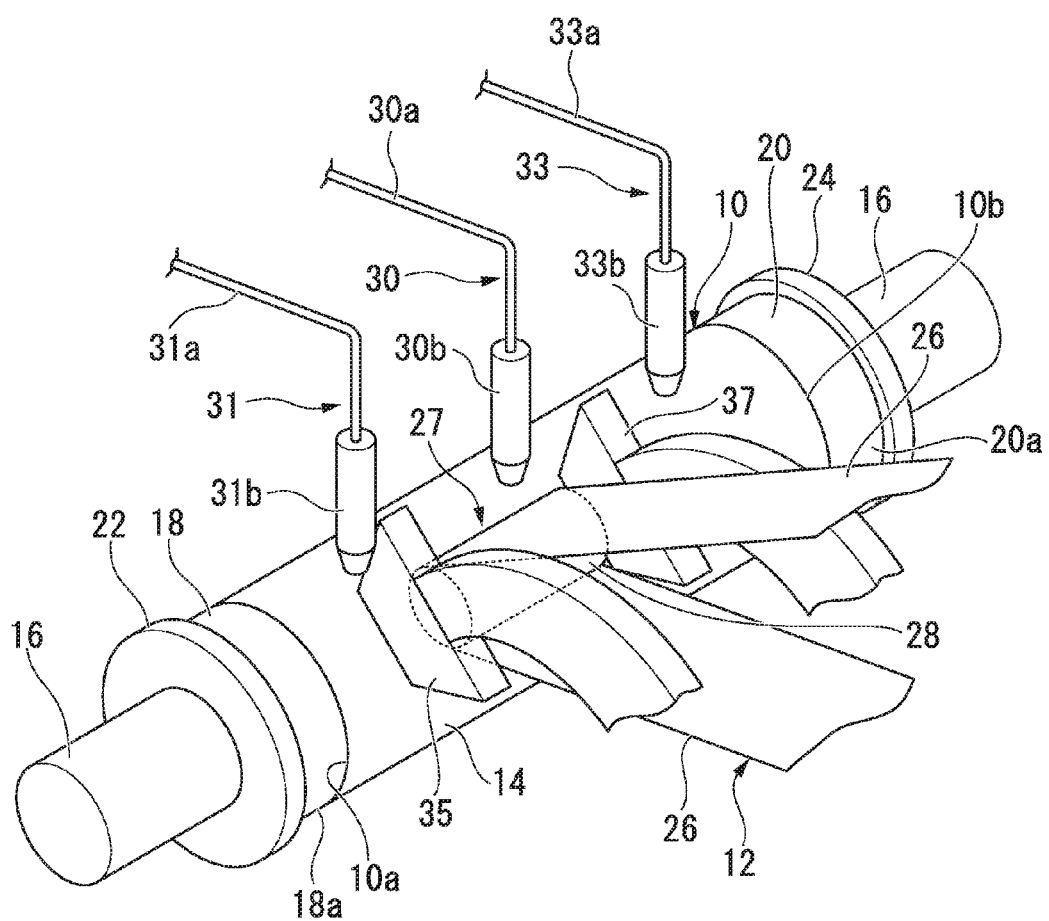
FIG. 15 is a perspective view illustrating still another aspect of the step (I) in the producing method according to the first embodiment of the invention.

For example, as illustrated in FIG. 15, a polishing solution is removed at the rear side of the polishing body moving in the axis direction by supplying a washing liquid from a first washing means 31 to wash the outer peripheral surface 14 of the aluminum substrate 10. The first washing means 31 includes a pipe 31a sending a washing liquid and a nozzle 31b disposed at the tip end of the pipe 31a. The first washing means 31 follows relative movement of the aluminum substrate 10 and the polishing body 26 to relatively move in the axis direction of the aluminum substrate 10.

When a polishing solution attached to the portion, in which polishing has been finished, in the outer peripheral surface 14 of the aluminum substrate 10 is removed by washing with a washing liquid, the polishing solution does not remain in the outer peripheral surface 14 of the aluminum substrate 10 for a long time after polishing. For this reason, it is suppressed that the outer peripheral surface 14 of the aluminum substrate 10 is transformed by the polishing solution.

It is preferable to perform washing of the outer peripheral surface 14 of the aluminum substrate 10 at the rear side of the polishing body 26 immediately after polishing body 26 passes. That is, it is preferable that a portion, which has been polished by the polishing body 26, in the outer peripheral surface 14 of the aluminum substrate 10 be immediately washed and the polishing solution be removed from the portion. According to this, it is possible to more stably suppress that the polished portion in the outer peripheral surface 14 of the aluminum substrate 10 is transformed by a polishing solution.

Further, it is more preferable to move the polishing body 26 in the axis direction while the outer peripheral surface 14 of the aluminum substrate 10 is continuously washed at the rear side of the polishing body 26. In this example, it is preferable to perform washing in such a manner that the first washing means 31 follows close behind the polishing body 26 and a washing liquid is continuously supplied to a portion, through which the polishing body 26 passes, in the outer peripheral surface 14 of the aluminum substrate 10. According to this, it is possible to more stably suppress that the polished portion in the outer peripheral surface 14 of the aluminum substrate 10 is transformed by a polishing solution.

Further, in addition to the washing at the rear side of the polishing body 26 moving in the axis direction, even at the front side of the polishing body 26 moving in the axis direction, it is preferable to remove a polishing solution by supplying a washing liquid from a second washing means 33 to wash the outer peripheral surface 14 of the aluminum substrate 10. The second washing means 33 includes a pipe 33a sending a washing liquid and a nozzle 33b disposed at the tip end of the pipe 33a. The second washing means 33 relatively moves at the front side of the polishing body 26 in the axis direction of the aluminum substrate 10 according to the relative movement of the aluminum substrate 10 and the polishing body 26.

When the outer peripheral surface 14 of the aluminum substrate 10 is washed also at the front side of the polishing body 26, it is suppressed that the outer peripheral surface 14 of the aluminum substrate 10 is transformed by a polishing solution erroneously attached to the surface which is not polished yet by the polishing body 26.

The washing of the outer peripheral surface 14 of the aluminum substrate 10 at the front side of the polishing body 26 is preferably performed at a position as close as possible to a contact portion 27 of the aluminum substrate 10 and the polishing body 26. According to this, it is possible to more stably suppress that a portion, which is not polished yet, in the outer peripheral surface 14 of the aluminum substrate 10 is transformed by the polishing solution.

Further, it is preferable to move the polishing body 26 in the axis direction while the outer peripheral surface 14 of the aluminum substrate 10 is continuously washed at the front side of the polishing body 26. In this example, it is preferable to perform washing in such a manner that the second washing means 33 moves at the front side of the polishing body 26 in the axis direction and a washing liquid is continuously supplied to a portion in the outer peripheral surface 14 of the aluminum substrate 10 at the front side of the polishing body 26. According to this, it is possible to more stably suppress that a portion, which is not polished yet, in the outer peripheral surface 14 of the aluminum substrate 10 is transformed by a polishing solution.

As a washing liquid, any washing liquid may be used as long as it can remove a polishing solution attached to the outer peripheral surface 14 by washing the outer peripheral surface 14 of the aluminum substrate 10, and for example, water, alcohol, an acidic or alkaline solution neutralizing a polishing slurry, and the like are exemplified. Among them, from the viewpoint of preventing corrosion of the aluminum substrate, or the like, water is preferable as a washing liquid.

Further, a gas is blown at the both sides of the polishing body 26 to the outer peripheral surface 14 of the aluminum substrate 10 by a first gas ejecting means 35 and a second gas ejecting means 37. According to this, it is possible to suppress that the polishing solution supplied to the contact portion 27 of the aluminum substrate 10 and the polishing body 26 flows out to a portion other than the contact portion 27. In this way, by blowing a gas, attachment of the polishing solution to the portion other than the contact portion 27 in the outer peripheral surface 14 of the aluminum substrate 10 is suppressed, and thus it is more stably suppressed that the outer peripheral surface 14 of the aluminum substrate 10 is transformed by the polishing solution.

Further, when a gas is blown in a curtain-shaped manner from the first gas ejecting means 35 and the second gas ejecting means 37 so as to divide the contact portion 27 and the portion other than contact portion in the outer peripheral surface 14 of the aluminum substrate 10, it is also possible to suppress that the washing liquid enter the contact portion 27. According to this, it is possible to more stably suppress that the composition of the polishing solution is changed by the washing liquid during polishing.

The gas blown to the both sides of the polishing body 26 in the outer peripheral surface 14 of the aluminum substrate 10 is not particularly limited, and examples thereof include nitrogen, carbon dioxide, and air. Among them, air is preferable as the gas to be blown in terms of using it simply.

In this way, the removal of the polishing solution by washing the outer peripheral surface 14 of the aluminum substrate 10 is particularly effective in the aspect in which the polishing body 26 is moved to one direction from the first end 10a to the second end 10b of the aluminum substrate 10 in the axis direction.

Specifically, in the aspect in which the whole outer peripheral surface of the aluminum substrate is polished by moving the polishing body to one direction, in order to perform the polishing at the same degree as the aspect in which polishing is performed by reciprocating the polishing body in the axis direction, it is necessary to delay the movement speed of the polishing body in the axis direction as compared with the aspect in which polishing is performed by reciprocating the polishing body in the axis direction. for this reason, in the aspect in which the polishing body is moved to one direction, regarding a portion close to the end at the side where polishing starts in the aluminum substrate, a time period from the passing of the polishing body to the finish of polishing becomes extremely long. In the invention, since a polishing solution is removed by washing a portion, through which the polishing body passes, in the outer peripheral surface of the aluminum substrate, even when a time period from the passing of the polishing body to the finish of polishing becomes long, it is possible to stably suppress transformation due to the polishing solution.

Incidentally, also in a case where a polishing solution is removed by washing the outer peripheral surface 14 of the aluminum substrate 10, polishing body 26 may be reciprocated on the outer peripheral surface 14 of the aluminum substrate 10 in the axis direction. In this case, the number of times at which the polishing body 26 is reciprocated may be appropriately set depending on conditions such as a target surface roughness, and may be 1 or 2 or more.

Further, the type of polishing in a case where a polishing solution is removed by washing the outer peripheral surface 14 of the aluminum substrate 10 is not particularly limited. For example, coarse polishing which uses a polishing solution including abrasive grains with a relatively large particle diameter in order to remove flaws attached to the outer peripheral surface 14 of the aluminum substrate 10, final polishing which uses a polishing solution including abrasive grains with a relatively small particle diameter in order to mirror-polish the outer peripheral surface 14 of the aluminum substrate 10, or both of the coarse polishing and the final polishing may be used.

In the coarse polishing, an acidic polishing solution is used in many cases. Since the acidic polishing solution easily transforms the aluminum substrate, in the producing method of the invention, the acidic polishing solution is particularly effective in the case of performing the coarse polishing using an acidic polishing solution.

Incidentally, for example, in a case where the final polishing is performed using an alkaline polishing solution after the coarse polishing with an acidic polishing solution, polishing may be performed in the coarse polishing while washing is carried out as described above and polishing may be performed in the final polishing without performing washing, within the range not impairing the effect of the invention.

<Step (II)>

After the outer peripheral surface 14 of the aluminum substrate 10 is polished in the step (I), an oxide film (anodic porous alumina) having a plurality of fine pores is formed on the outer peripheral surface 14 by anodization. As a method of forming the oxide film, for example, a method including the following steps (a) to (f) is exemplified.

Figure 7:
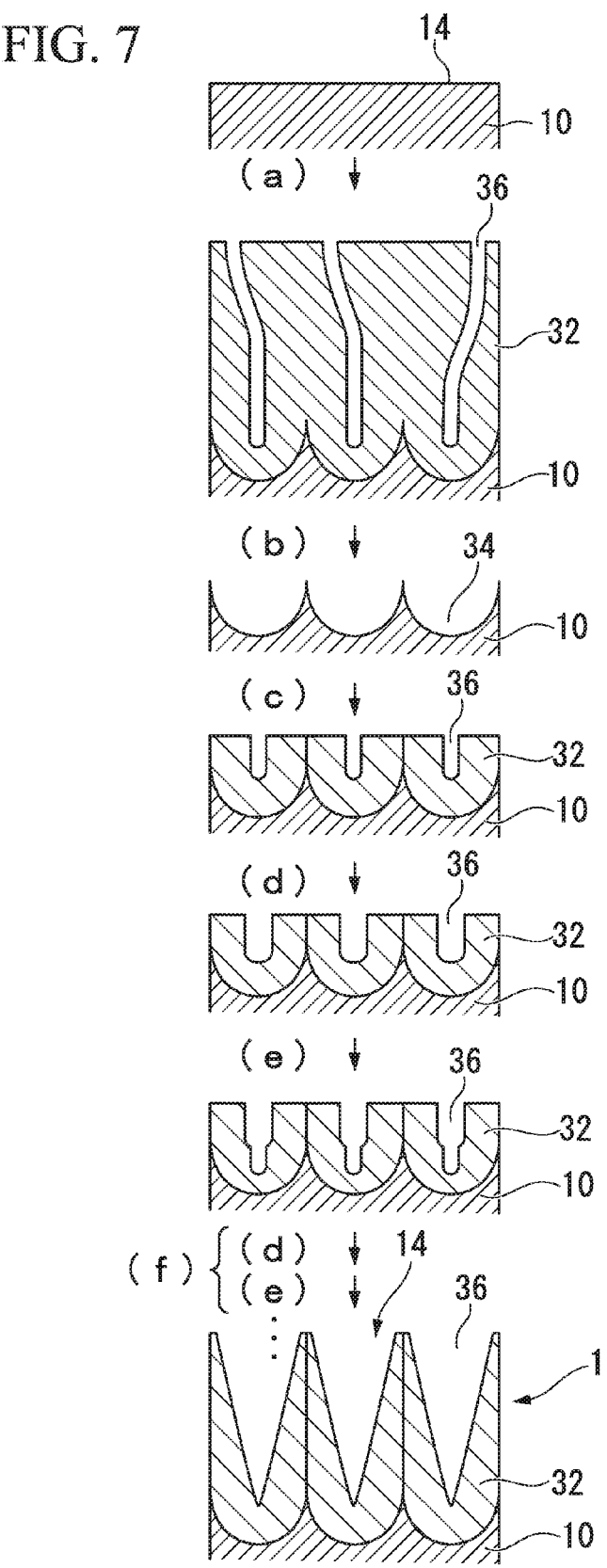
FIG. 7 is a cross-sectional view illustrating an example of a step (II) in the producing method according to the first embodiment of the invention.

(a) An oxide film 32 is formed on the outer peripheral surface 14 of the aluminum substrate 10, as illustrated in FIG. 7, by anodizing the aluminum substrate 10 in an electrolyte under a constant voltage.

(b) Anodized fine pore generation points 34 are formed on the outer peripheral surface 14 of the aluminum substrate 10 by removing a part or the whole of the oxide film 32.

(c) The oxide film 32 having fine pores 36 at the fine pore generation points 34 is formed by anodizing the aluminum substrate 10 in an electrolyte again.

(d) The diameters of the fine pores 36 are increased by removing a part of the oxide film 32.

(e) After the step (d), the aluminum substrate 10 is anodized again in an electrolyte.

(f) The step (d) and the step (e) are repeatedly performed to obtain a cylindrical nanoimprinting mold 1 (hereinafter, referred to as the "mold 1") in which the oxide film 32 having a plurality of fine pores 36 is formed on the outer peripheral surface 14.

<<Step (a)>>

When the aluminum substrate 10 is anodized under a constant voltage in an electrolyte, the oxide film 32 having the fine pores 36 is formed on the outer peripheral surface 14.

As an electrolyte, a sulfuric acid aqueous solution, an oxalic acid aqueous solution, a phosphoric acid aqueous solution, or the like is exemplified.

When the oxalic acid aqueous solution is used as an electrolyte, the concentration of oxalic acid is preferably 0.7 M or less. When the concentration of oxalic acid is 0.7 M or less, a current value is so high that it is easy to suppress the roughness of the surface of the oxide film 32.

Further, in this case, the applied voltage is preferably 30 to 60 V. When the applied voltage is within the above range, the fine pores 36 with high regularity are easily formed.

Further, the temperature of the electrolyte is preferably 60° C. or lower and more preferably 45° C. or lower. When the temperature of the electrolyte is 60° C. or lower, occurrence of a phenomenon, so-called "burning", is easily suppressed, and thus the fine pores 36 with high regularity are easily formed.

When the sulfuric acid aqueous solution is used as an electrolyte, the concentration of sulfuric acid is preferably 0.7 M or less. When the concentration of sulfuric acid is 0.7 M or less, it is easy to suppress that a current value is too high, and thus the constant voltage is easily maintained.

Further, in this case, the applied voltage is preferably 25 to 30 V. When the applied voltage is within the above range, the fine pores 36 with high regularity are easily formed.

Further, the temperature of the electrolyte is preferably 30° C. or lower and more preferably 20° C. or lower. When the temperature of the electrolyte is 30° C. or lower, occurrence of a phenomenon, so-called "burning", is easily suppressed, and thus the fine pores 36 with high regularity are easily formed.

<<Step (b)>>

A part or the whole of the oxide film 32 is temporally removed to form the anodized fine pore generation points 34. According to this, the regularity of the fine pores can be improved. Even in a state where a part of the oxide film 32 remains without removing the whole of the oxide film, if the regularity is sufficiently improved in the remaining portions of the oxide film 32, the effect of removing the oxide film can be achieved.

As a method of removing the oxide film, a method of removing the oxide film by dissolving the oxide film in a solution that selectively dissolves the oxide film without dissolving aluminum is exemplified. As such a solution, for example, a mixture of chromic acid/phosphoric acid is exemplified.

<<Step (c)>>

When the aluminum substrate 10 in which at least a part of the oxide film 32 is removed is anodized again, the oxide film 32 having cylindrical fine pores 36 is formed.

The anodization may be performed under the same conditions as in the step (a). It is possible to form deeper fine pores 36 as the anodization is performed for a longer time. The voltage of anodization, the types or the temperature of the electrolyte, and the like in the step (c) can be appropriately adjusted in a range such that the effect of the step (b) is not lost.

<<Step (d)>>

A process of increasing the diameter of the fine pores 36 (hereinafter, referred to as a fine pore diameter-increasing process) is performed.

The fine pore diameter-increasing process is a process of increasing the diameter of the fine pores obtained by anodizing the oxide film through immersion in a solution that dissolves the oxide film. As a solution that dissolves the oxide film, for example, a phosphoric acid aqueous solution of about 5% by mass is exemplified.

The longer the fine pore diameter-increasing process, the larger the fine pore diameter.

<<Step (e)>>

After the step (d), when the aluminum substrate 10 is re-anodized, cylindrical fine pores 36 with a small diameter which extend downward from the bottom portions of the cylindrical fine pores 36 are further formed.

The anodization may be performed under the same conditions as in the step (a). It is possible to obtain deeper fine pores 36 as the anodization is performed for a longer time.

<<Step (f)>>

When the fine pore diameter-increasing process of the step (d) and the anodization of the step (e) are repeated, it is possible to obtain the mold 1 in which the oxide film 32 having the fine pores 36 with a shape in which the diameter continuously decreases from an opening portion to a depth direction is formed on the outer peripheral surface 14 of the aluminum substrate 10.

It is preferable to finish the processes with the step (d) as the final process.

The number of repetitions of the step (d) and the step (e) is preferably three or more in total, and more preferably five or more. When the number of repetitions is three or more, it is easy to obtain the mold 1 in which the oxide film 32 having the fine pores 36 with a sufficient diameter is formed. Therefore, by the mold 1, the reflectance-reducing effect or the like is easily achieved in an article to which a moth-eye structure is transferred.

The shape of the fine pores 36 may be a substantially conical shape, a pyramidal shape, a cylindrical shape, or the like. Among these, as the shape of the fine pores 36, it is preferable to have a shape in which the cross-sectional area of the fine pore in a direction perpendicular to the depth direction continuously decreases from the outermost surface to the depth direction as in a conical shape and pyramidal shape.

The average interval between the fine pores 36 is preferably equal to or less than the wavelength of the visible light, that is, equal to or less than 400 nm. The average interval between the fine pores 36 is preferably 20 nm or more.

The average interval between the fine pores 36 is obtained by measuring the interval between adjacent fine pores 36 (the distance from the center of a fine pore 36 to the center of an adjacent fine pore 36) at 50 points using electron microscope observation, and then averaging these values.

The depth of the fine pores 36 is preferably 80 to 500 nm, more preferably 120 to 400 nm, and particularly preferably 150 to 300 nm when the average interval thereof is 100 nm.

The depth of the fine pores 36 is obtained by measuring a distance between the lowermost portion of the fine pore 36 and the uppermost portion of a convex portion between the fine pores 36 when observed by electron microscope observation at 30000-fold magnification, and then averaging these values.

The aspect ratio of the fine pores 36 (depth of the fine pores/average interval between fine pores) is preferably 0.8 to 5.0, more preferably 1.2 to 4.0, and particularly preferably 1.5 to 3.0.

For example, when the oxide film 32 formed on the outer peripheral surface of the mold 1 is pressed against a surface of a resin molded body, it is possible to obtain an article having a concave-convex microstructure, which is formed by protrusions having a shape complementary to the shape of the fine pores 36 formed on the oxide film 32, on the surface thereof.

<Effect>

When a polishing body having a length along the axis direction longer than the length of the aluminum substrate in the axis direction is used in the case of polishing the whole outer peripheral surface of the cylindrical aluminum substrate, such a polishing body is not practical in consideration of easy availability of a polishing body, workability of replacement of a polishing body, or the like. For this reason, it is practical to polish the whole outer peripheral surface of the aluminum substrata while a polishing body, which has a length in the axis direction shorter than the length of the cylindrical aluminum substrate in the axis direction, is moved in the axis direction.

On the other hand, generally, in polishing of the whole surface of a substrate, polishing is performed such that a polishing body does not protrude beyond the surface of the substrate for the purpose that the vicinity of the end of the surface of the substrate is not excessively polished, the polishing body is difficult to damage, and the like. However, when polishing is performed such that the polishing body is not protruded beyond the outer peripheral surface in polishing of the whole outer peripheral surface of the cylindrical aluminum substrate, the polishing time in the vicinity of the end of the outer peripheral surface in the axis direction becomes shorter than the polishing time in the center portion as described above, and thus the surface roughness becomes non-uniform.

In contrast to this, in the method for producing the mold 1 according to the first embodiment, the polishing body 26 is moved in the axis direction such that at least a part of the polishing body protrudes beyond the aluminum substrate 10 at the first end 10*a* side and the second end 10*b* side of the cylindrical aluminum substrate 10. Therefore, a difference in polishing time between the first end 10*a* and the second end 10*b* can be decreased in the outer peripheral surface 14 of the aluminum substrate 10. According to this, the outer peripheral surface 14 of the aluminum substrate 10 is polished from the first end 10*a* to the second end 10*b* at the same degree, and thus the uniformity of the surface roughness of the outer peripheral surface 14 becomes favorable.

Further, in the method for producing the mold 1 according to the first embodiment, when at least a part of the polishing body 26 is protruded at the first end 10*a* side and the second end 10*b* side of the aluminum substrate, the protruding portion of the polishing body 26 comes into contact with the first support member 18 and the second support member 20 so as to be supported. According to this, it is suppressed that an excessive polishing pressure is locally applied to the first end 10*a* and the second end 10*b* of the aluminum substrate 10 by the polishing body 26. Therefore, the vicinity of the first end 10*a* and the vicinity of the second end 10*b* in the outer peripheral surface 14 of the aluminum substrate 10 are polished at the same degree as the center portion in the axis direction, and thus the uniformity of the surface roughness becomes favorable.

As described above, according to the method for producing the mold 1 of the first embodiment, the outer peripheral surface 14 of the cylindrical aluminum substrate 10 is uniformly polished, and thus it is possible to obtain the mold 1 in which the outer peripheral surface 14 is more effectively utilized.

Further, in the producing method according to the first embodiment of the invention, the control is simple and polishing with more favorable uniformity of the surface roughness can be performed as compared with a method in which the polishing time of the aluminum substrate in the axis direction make uniform by controlling the movement speed of the polishing body such that the contact time of the polishing body becomes longer at the end side of the aluminum substrate in the axis direction.

Further, when the outer peripheral surface of the cylindrical aluminum substrate is polished by a polishing body having a length of the axis direction shorter than that of the aluminum substrate while the polishing body is moved in the axis direction, the portion, in which polishing has been first finished, of the aluminum substrate is transformed, and the whitening phenomenon may occur in some cases. This phenomenon particularly significantly occur when the coarse polishing is performed particularly using an acidic polishing solution. This whitening phenomenon is speculated to occur due to the formation of an oxide layer (aluminum oxide layer) on the outer peripheral surface of the aluminum substrate by a polishing solution.

Further, the whitened portion in the aluminum substrate is difficult to cut by polishing as compared with portions other than the whitened portion. For this reason, if the whitening occurs once on the outer peripheral surface of the aluminum substrate, an extremely long time requires for removing the whitened portion and then mirror-polishing the surface.

In this case, in the producing method according to the first embodiment described above, when the outer peripheral surface 14 of the aluminum substrate 10 is polished, the outer peripheral surface 14 of the aluminum substrate 10 is washed at the front side or both the front side and the rear side of the polishing body 26 moved in the axis direction to remove the polishing solution. According to this, the contact time of a portion, which is not polished by the polishing body 26, in the outer peripheral surface 14 of the aluminum substrate 10 with the polishing solution is shortened, and thus transformation due to the polishing solution is suppressed. In this way, when the polishing solution is removed by performing washing at least at the rear side of the polishing body 26, it is suppressed that transformation, such as whitening, due to the polishing solution occurs on the outer peripheral surface 14 of the aluminum substrate 10 after polishing. Therefore, a mold can be produced with high productivity.

Incidentally, the producing method according to the first embodiment of the invention is not limited to the method for producing the mold 1 described above.

Figure 8:
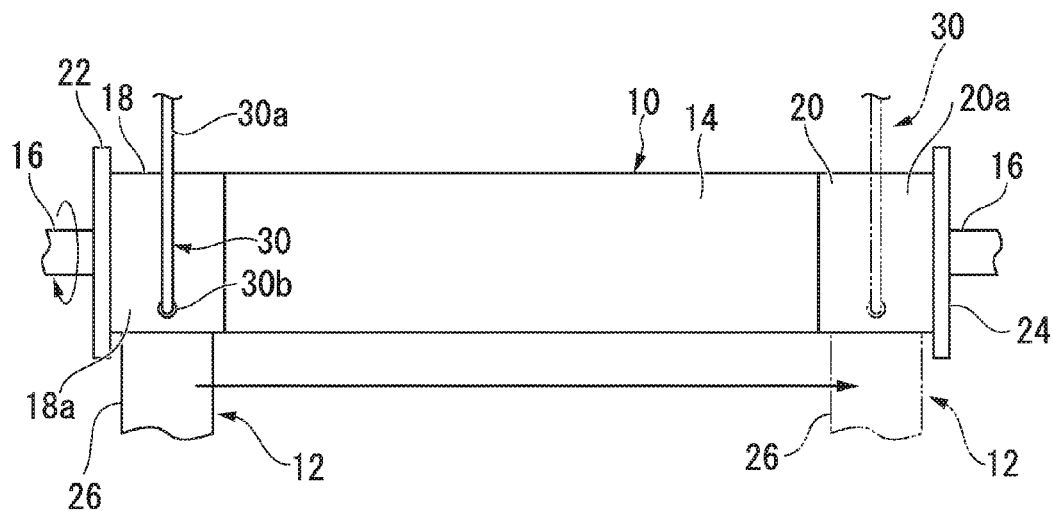
FIG. 8 is a plan view illustrating another aspect of the step (I) in the producing method according to the first embodiment of the invention.

For example, in the step (I), the polishing body 26 may be reciprocated along the axis direction of the aluminum substrate 10. For example, as illustrated in FIG. 8, a method in which the polishing body 26 is moved once toward the second support member 20 in the axis direction of the aluminum substrate 10 such that at least a part of the polishing body 26 is protruded to the second support member 20 side from a state where at least a part of the polishing body 26 protrudes to the first support member 18 side may be employed. The same portions in FIG. 8 as those in FIG. 3 are represented by the same symbols and description thereof will be omitted.

Figure 9:
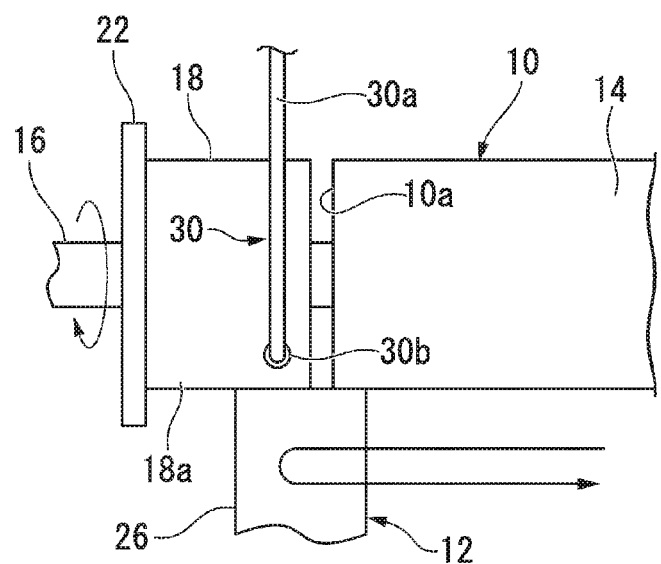
FIG. 9 is a plan view illustrating still another aspect of the step (I) in the producing method according to the first embodiment of the invention.

Further, the support member to be disposed at the end side of the aluminum substrate in the axis direction and the aluminum substrate may be separated from each other, within the range not impairing the effect of the invention. For example, as illustrated in FIG. 9, within the range in which at least a part, which is protruded at the first end 10*a* side of the aluminum substrate 10, of the polishing body 26 is disposed on the first support member 18 and comes into contact with the outer peripheral surface 18*a* of the first support member 18 so as to be supported, the first support member 18 and the aluminum substrate 10 may be separated from each other. The same portions in FIG. 9 as those in FIG. 3 are represented by the same symbols and description thereof will be omitted.

In the invention, it is preferable that the support member to be disposed at the end side of the aluminum substrate in the axis direction and the aluminum substrate come into close contact with each other.

Further, the invention is not limited to the aspect in which a support member is formed in a cylindrical shape and the outer peripheral surface of the support member is polished together with the outer peripheral surface of the aluminum substrate.

Figure 10:
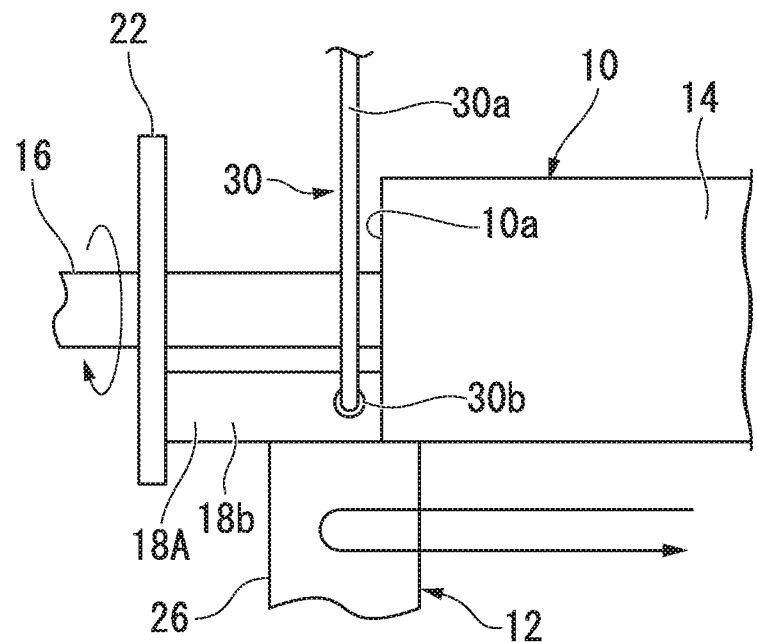
FIG. 10 is a plan view illustrating still another aspect of the step (I) in the producing method according to the first embodiment of the invention.
Figure 11:
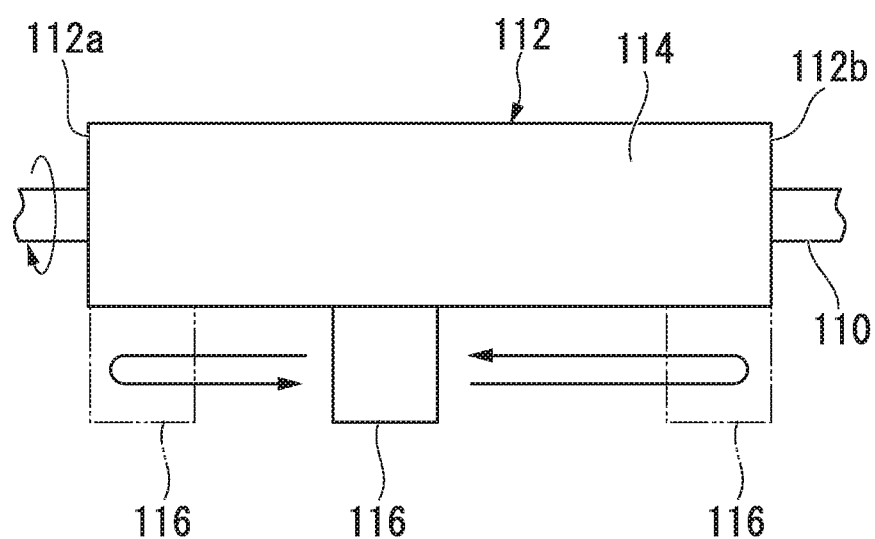
FIG. 11 is a plan view describing an aspect in which an outer peripheral surface of a cylindrical aluminum substrate is polished.

For example, as illustrated in FIG. 10, an aspect in which a first support member 18A, which does not rotate, is disposed at the polishing body 26 side in the first end 10a side of the aluminum substrate 10 rather than the rotation axis 16, independently from the rotation axis 16 may be employed. The same portions in FIG. 10 as those in FIG. 3 are represented by the same symbols and description thereof will be omitted.

The shape of a surface 18b, with which the polishing body 26 comes into contact, of the first support member 18A is the same curved shape as that of the outer peripheral surface 14 of the aluminum substrate 10, and the first support member 18A supports the polishing body 26 protruding beyond the first end 10a of the aluminum substrate 10. That is, the shape obtained by cutting the surface 18b of a portion, at which the polishing body 26 is disposed, of the first support member 18A in a direction perpendicular to the axis direction of the aluminum substrate 10 is an arc shape configuring at least a part of circumference having a diameter substantially equal to or less than the outer diameter of the aluminum substrate 10. Further, since the first support member 18A is not rotated by the rotation axis 16 but the position thereof is fixed, even when the first support member comes into contact with the polishing body 26 protruding beyond the aluminum substrate 10, the first support member is not polished.

The shape of the portion, in which the polishing body 26 is disposed, of the first support member 18A is preferably a shape configuring at least a part of a cylindrical shape having an outer diameter 0.97 or more times but 1 or less times the outer diameter of the aluminum substrate 10, and more preferably a shape configuring at least a part of a cylindrical shape having an outer diameter 0.99 or more times but 1 or less times the outer diameter of the aluminum substrate 10.

Further, the method for producing a mold according to the first embodiment of the invention is not limited to the aspect in which support members are disposed at both end sides of the aluminum substrate in the axis direction and at least a part of a polishing body is protruded at the both end side thereof from the aluminum substrate.

For example, the method for producing a mold according to the first embodiment of the invention may be a method in which a support member is disposed only at one end of the aluminum substrate in the axis direction and a polishing body is moved such that at least a part of the polishing body is protruded only at the one end thereof from the aluminum substrate. In this case, since a difference in the polishing time between the end side at which the polishing body is protruded and the center portion of the axis direction decreases at the end side, as compared with a case where the polishing body is not protruded at all beyond the outer peripheral surface of the aluminum substrate, uniformity of the surface roughness of the outer peripheral surface of the aluminum substrate is improved.

In the first embodiment of the invention, from the viewpoint that the surface roughness of the outer peripheral surface of the aluminum substrate becomes more uniform and the outer peripheral surface is more effectively utilized, a method is preferable in which support members are disposed at both end sides of the aluminum substrate in the axis direction and at least a part of a polishing body is protruded beyond the aluminum substrate at the both end side thereof.

Further, in the producing method according to the first embodiment of the invention, for example, in a case where polishing paper in which SiC powder is embedded with permanent paper, a polishing disk in which diamond powder is embedded with metal, or the like is used as the polishing body, a method in which a polishing solution is not supplied to the contact portion of the outer peripheral surface of the aluminum substrate and the polishing body may be employed.

Further, in the producing method according to the first embodiment of the invention, the polishing body may be relatively moved in the axis direction with respect to the outer peripheral surface of the aluminum substrate, and the producing method is not limited to the aspect in which the polishing body is moved in the axis direction. For example, the polishing body may be relatively moved in the axis direction with respect to the outer peripheral surface of the aluminum substrate by moving the aluminum substrate in the axis direction thereof in a state where the position of the polishing body is fixed. Further, the polishing body may be relatively moved in the axis direction with respect to the outer peripheral surface of the aluminum substrate by moving both the aluminum substrate and the polishing body in the axis direction.

Further, the producing method according to the first embodiment of the invention may be a method of washing the outer peripheral surface of the aluminum substrate at the front side and the rear side of the polishing body moved in the axis direction, or a method in which the outer peripheral surface of the aluminum substrate is washed at the rear side of the polishing body and the outer peripheral surface of the aluminum substrate is not washed at the front side of the polishing body. A polishing solution is necessarily attached to a portion, which is polished at the rear side of the polishing body, in the aluminum substrate, but a polishing solution is not always attached to a portion, which is not polished yet at the front side of the polishing body. Further, even in a case where a polishing solution, which is intended to be supplied to the contact portion with the polishing body in the outer peripheral surface of the aluminum substrate, is erroneously attached to the front side of the polishing body, a portion to which the polishing solution is attached is not greatly separated from the contact portion in most cases. For this reason, even when the polishing solution is attached to the front side in the outer peripheral surface of the aluminum substrate, if the time for moving the polishing body to the portion attached with the polishing solution is short, the influence of transformation due to the polishing solution is small. As described above, since the influence of the transformation such as whitening due to the polishing solution is large particularly at the rear side of the polishing body, if washing is performed at least at the rear side of the polishing body, the transformation of the aluminum substrate can be suppressed sufficiently.

Further, the producing method according to the first embodiment of the invention may be a method in which the outer peripheral surface of the aluminum substrate is not washed at both the front side and the rear side of the polishing body moved in the axis direction.

Figure 16:
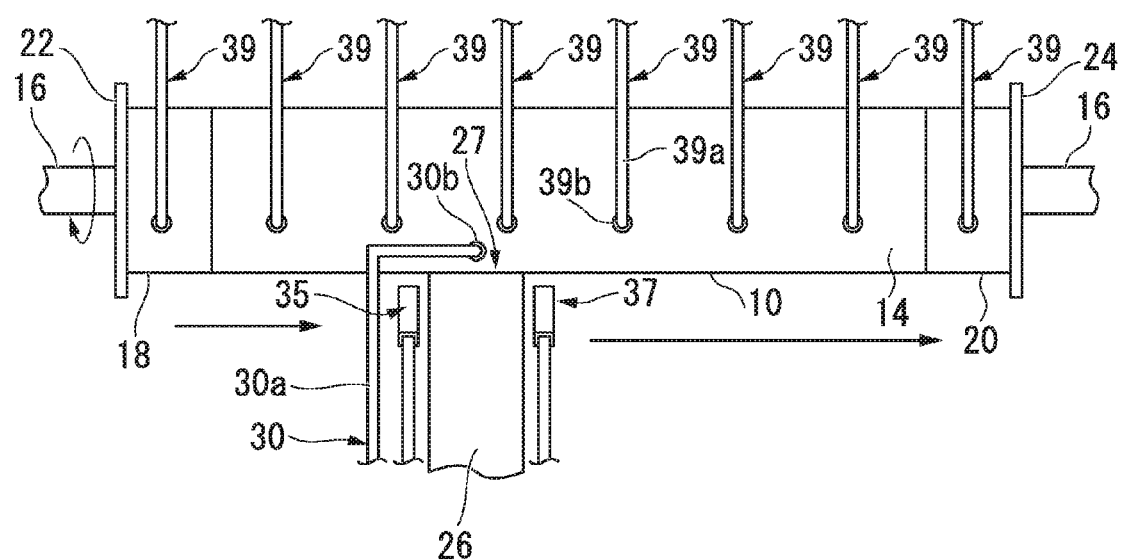
FIG. 16 is a plan view illustrating still another aspect of the step (I) in the producing method according to the first embodiment of the invention.

Further, in the producing method according to the first embodiment of the invention, as illustrated in FIG. 16, washing may be performed at the rear side of the polishing body 26 or the front side and the rear side of the polishing body 26 in such a manner that a plurality of washing means 39 disposed in the axis direction of the aluminum substrate 10 with an equal interval is used instead of the first washing means 31 and the second washing means 33, and a washing liquid is sequentially supplied from the respective washing means 39 according to the movement of the polishing body 26 to the axis direction.

Each washing means 39 includes a pipe 39a sending a washing liquid and a nozzle 39b disposed at the tip end of the pipe 39a. Further, the position of each washing means 39 is fixed.

Further, the producing method according to the first embodiment of the invention may be a method in which a gas is not blown to the both sides of the polishing body in the axis direction in the outer peripheral surface of the aluminum substrate.

Further, in the producing method according to the first embodiment of the invention, the method of washing the outer peripheral surface of the aluminum substrate is not limited to a method of performing washing with a washing liquid. For example, the method of washing the outer peripheral surface of the aluminum substrate may be a method in which the polishing solution is removed from the surface of the aluminum substrate by a sponge or the like.

Second Embodiment

A method for producing a mold according to a second embodiment of the invention is a method for producing a mold in which an oxide film having a plurality of fine pores is formed on an outer peripheral surface of a cylindrical aluminum substrate.

Hereinafter, an example of a polishing apparatus used in the method for producing a mold according to the second embodiment of the invention will be described.

<Polishing Apparatus>

Figure 17:
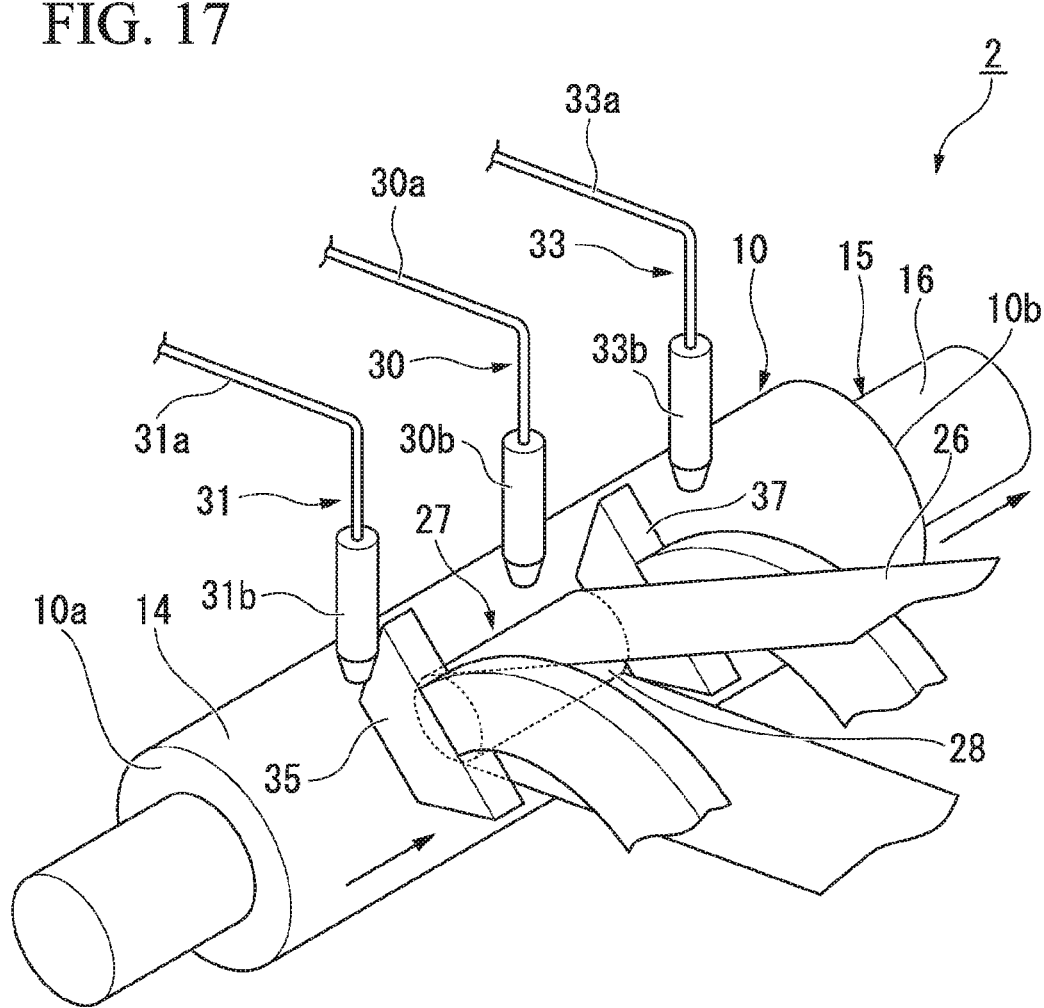
FIG. 17 is a perspective view illustrating an example of a step (I) in a producing method according to a second embodiment of the invention.
Figure 18:
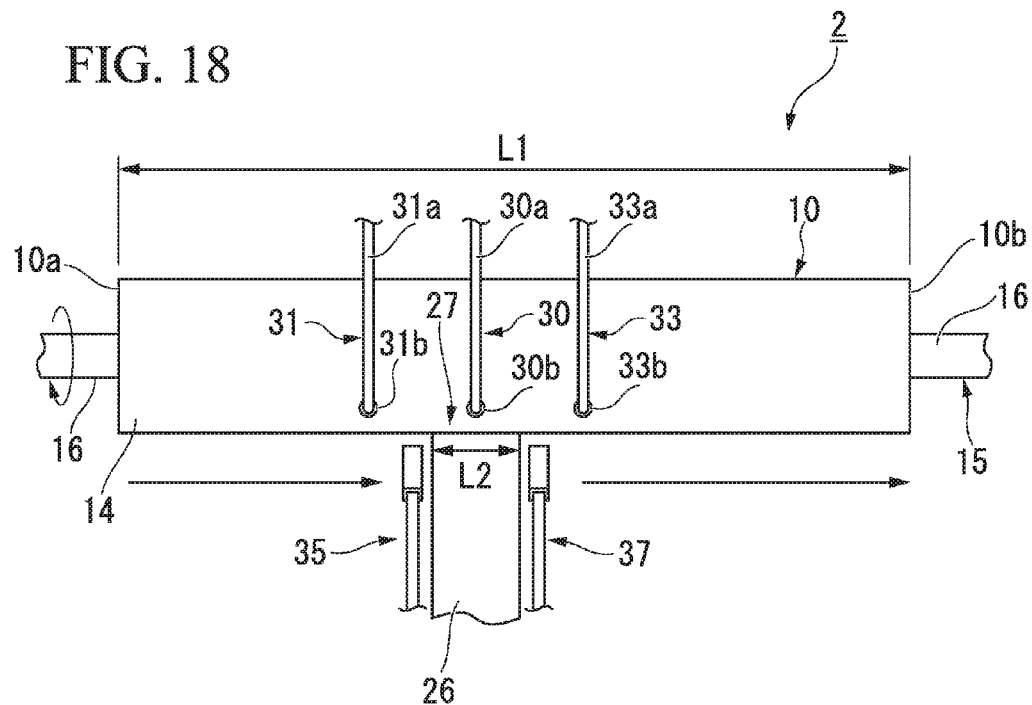
FIG. 18 is a plan view of the step (I) illustrated in FIG. 17.

A polishing apparatus 2 of this embodiment includes, as illustrated in FIG. 17 and FIG. 18, a polishing body 26, a rubbing means 15, a polishing solution supplying means 30, a first washing means 31, a second washing means 33, a first gas ejecting means 35, and a second gas ejecting means 37.

The polishing body 26 is the same as described in the first embodiment. The polishing body 26 has the length L2 (FIG. 18) along the axis direction of the aluminum substrate 10 shorter than the length L1 (FIG. 18) of the aluminum substrate 10 in the axis direction. Further, the polishing body 26 in this example is belt-hasped, but the polishing body 26 is not limited to a belt shape.

The rubbing means 15 is a means for rubbing the aluminum substrate 10 and the polishing body 26. That is, the rubbing means is a means for moving the aluminum substrate and the polishing body so as to be rubbed with each other in a state where the polishing body 26 is brought into contact with the outer peripheral surface 14 of the aluminum substrate 10.

The rubbing means 15 in this example includes a rotation axis 16 in which the aluminum substrate 10 is disposed, an axis driving unit (not illustrated) rotating the rotation axis 16 around the axis, a conveyance roll 28 conveying the belt-shaped polishing body 26, and a roll driving unit (not illustrated) driving the conveyance roll 28. The axis driving unit rotates the rotation axis 16 around the axis so that the aluminum substrate 10 is rotated around the axis. Further, the roll driving unit drives the conveyance roll 28 so that the polishing body 26 is conveyed in the longitudinal direction while the polishing body 26 is pressed against the outer peripheral surface 14 of the aluminum substrate 10.

The rubbing means 15 of this example moves the aluminum substrate and the polishing body in a contact portion 27 at which the outer peripheral surface 14 of the aluminum substrate 10 and the polishing body 26 come into contact to each other such that the rotation direction of the aluminum substrate 10 and the direction in which the polishing body 26 is conveyed are opposite to each other, and thereby the aluminum substrate and the polishing body are rubbed with each other.

Incidentally, the aspect of the rubbing means 15 is not limited. For example, a rubbing means does not include a conveyance roll and a roll driving unit and rubs the aluminum substrate 10 and the polishing body 26 only by rotating the aluminum substrate 10 around the axis without the polishing body 26 being conveyed.

Further, in the polishing apparatus 2, the polishing body 26 and the aluminum substrate 10 can be moved with respect to each other in the axis direction of the aluminum substrate 10 by a moving means (not illustrated). The moving means relatively moves the aluminum substrate 10 and the polishing body 26 in the axis direction of the aluminum substrate 10 from a first end 10a to a second end 10b of the aluminum substrate 10 in a state where the polishing body 26 is pressed against the outer peripheral surface 14 of the aluminum substrate 10.

When the polishing body 26 is moved with respect to the aluminum substrate 10 in the axis direction in this way, the whole outer peripheral surface 14 of the aluminum substrate 10 can be polished by the polishing body 26.

The moving means may be a means for moving only the polishing body 26 so as to relatively move the polishing body 26 and the aluminum substrate 10 in the axis direction, a means for moving the only the aluminum substrate 10 so as to relatively move the polishing body 26 and the aluminum substrate 10 in the axis direction, or a means for moving both the polishing body 26 and the aluminum substrate 10 so as to relatively move the polishing body 26 and the aluminum substrate 10 in the axis direction.

The polishing solution supplying means 30 is a means for supplying a polishing solution to the contact portion 27 with the polishing body 26 in the outer peripheral surface 14 of the aluminum substrate 10, that is, the portion, with which the polishing body 26 comes into contact, in the outer peripheral surface 14 of the aluminum substrate 10.

The polishing solution supplying means 30 includes, for example, a pipe 30a sending a polishing solution and a nozzle 30b disposed at the tip end of the pipe 30a. The polishing solution supplying means 30 is disposed to supply a polishing solution to the contact portion 27 with the polishing body 26 in the outer peripheral surface 14 of the aluminum substrate 10, and follows the relative movement of the aluminum substrate 10 and the polishing body 26 so as to relatively move.

The polishing solution supplying means 30 is not limited to the above-described aspect as long as it can supply a polishing solution to the contact portion 27 in the outer peripheral surface 14 of the aluminum substrate 10.

The first washing means 31 is a means for washing the outer peripheral surface 14 of the aluminum substrate 10 at the rear side of the polishing body 26 moving in the axis direction to remove the polishing solution. In the polishing apparatus 2, the portion, through which the polishing body 26 passes, in the outer peripheral surface 14 of the aluminum substrate 10, that is, the portion, in which polishing has been finished, is washed by the first washing means 31 to remove the polishing solution.

From the viewpoint of high removing efficiency of the polishing solution, the first washing means 31 is preferably a means for supplying a washing liquid to the outer peripheral surface 14 of the aluminum substrate 10 to remove the polishing solution.

Specifically, the first washing means 31 includes the pipe 31a sending a washing liquid and the nozzle 31b disposed at the tip end of the pipe 31a. The first washing means 31 is disposed to supply a polishing solution to the rear side of the polishing body 26 moving in the axis direction in the outer peripheral surface 14 of the aluminum substrate 10. Further, the first washing means 31 follows the relative movement of the aluminum substrate 10 and the polishing body 26 to relatively move in the axis direction of the aluminum substrate 10.

The second washing means 33 is a means for washing the outer peripheral surface 14 of the aluminum substrate 10 at the front side of the polishing body 26 moving in the axis direction to remove the polishing solution. In the polishing apparatus 2, a portion, which is not polished yet by the polishing body 26, in the outer peripheral surface 14 of the aluminum substrate 10 is washed by the second washing means 33, and thus the polishing solution erroneously attached to this portion is removed.

From the same reason as the first washing means 31, the second washing means 33 is preferably a means for supplying a washing liquid to the outer peripheral surface 14 of the aluminum substrate 10 to remove the polishing solution as in this example.

Specifically, the second washing means 33 includes the pipe 33a sending a washing liquid and the nozzle 33b disposed at the tip end of the pipe 33a. The second washing means 33 is disposed to supply a washing liquid to the front side of the polishing body 26 moving in the axis direction in the outer peripheral surface 14 of the aluminum substrate 10. Further, the second washing means 33 relatively moves at the front side of the polishing body 26 in the axis direction of the aluminum substrate 10 according to the relative movement of the aluminum substrate 10 and the polishing body 26.

A first gas ejecting means 35 is a means for ejecting a gas at the rear side of the polishing body 26 moving in the axis direction to a portion between the contact portion 27 with the polishing body 26 and the portion to which a washing liquid is supplied from the first washing means 31 in the outer peripheral surface 14 of the aluminum substrate 10. In the polishing apparatus 2, when a gas is blown at the rear side of the polishing body 26 moving in the axis direction to the outer peripheral surface 14 of the aluminum substrate 10 by the first gas ejecting means 35, it is suppressed that the polishing solution supplied to the contact portion 27 of the aluminum substrate 10 and the polishing body 26 flows out to the rear side of the contact portion 27.

Further, the first gas ejecting means 35 of this example blows a gas in a curtain-shaped manner so as to divide the contact portion 27 with the polishing body 26 and the portion to which a washing liquid is supplied from the first washing means 31 in the outer peripheral surface 14 of the aluminum substrate 10. According to this, entering of the washing liquid to the polishing solution supplied to the contact portion 27 during polishing is suppressed, and thus it is possible to more stably suppress that the composition of the polishing solution is changed.

A second gas ejecting means 37 is a means for ejecting a gas at the front side of the polishing body 26 moving in the axis direction to a portion between the contact portion 27 with the polishing body 26 and the portion to which a washing liquid is supplied from the second washing means 33 in the outer peripheral surface 14 of the aluminum substrate 10. In the polishing apparatus 2, when a gas is blown at the front side of the polishing body 26 moving in the axis direction to the outer peripheral surface 14 of the aluminum substrate 10 by the second gas ejecting means 37, it is suppressed that the polishing solution supplied to the contact portion 27 of the aluminum substrate 10 and the polishing body 26 flows out to the front side of the contact portion 27.

Further, similarly to the first gas ejecting means 35, the second gas ejecting means 37 of this example blows a gas in a curtain-shaped manner so as to divide the contact portion 27 with the polishing body 26 and the portion to which a washing liquid is supplied from the second washing means 33 in the outer peripheral surface 14 of the aluminum substrate 10. According to this, entering of the washing liquid to the polishing solution supplied to the contact portion 27 during polishing is suppressed, and thus it is possible to more stably suppress that the composition of the polishing solution is changed.

Hereinafter, the action of the polishing apparatus 2 will be described.

In the polishing apparatus 2, the aluminum substrate 10 as a subject to be polished is disposed at the rotation axis 16 of the rubbing means 15 and the rotation axis 16 is rotated around the axis by the axis driving unit. According to this, the aluminum substrate 10 is rotated around the axis. Further, the conveyance roll 28 is driven by the roll driving unit of the rubbing means 15 and the polishing body 26 is conveyed in the length direction thereof. At this time, the polishing body 26 is conveyed in the contact portion 27 of the outer peripheral surface 14 of the aluminum substrate 10 and the polishing body 26 such that the rotation direction of the aluminum substrate 10 and the direction in which the polishing body 26 is conveyed are opposite to each other. According to this, the outer peripheral surface 14 of the aluminum substrate 10 and the polishing body 26 are rubbed with each other at the contact portion 27. A polishing solution is supplied to the contact portion 27 from the polishing solution supplying means 30. According to this, the outer peripheral surface 14 of the aluminum substrate 10 is polished using the polishing solution by the polishing body 26.

In the polishing apparatus 2, polishing starts from the first end 10a of the aluminum substrate 10, and the polishing body 26 is relatively moved in the axis direction of the aluminum substrate 10 from the first end 10a to the second end 10b of the aluminum substrate 10 by the moving means. According to this, the whole outer peripheral surface 14 of the aluminum substrate 10 is polished by the polishing body 26.

Further, in the polishing apparatus 2, the portion, in which polishing has been finished, in the outer peripheral surface 14 of the aluminum substrate 10 is washed by the first washing means 31 to remove the polishing solution. According to this, since the polishing solution does not remain in the outer peripheral surface 14 of the aluminum substrate 10 for a long time after polishing, it is suppressed that the aluminum substrate 10 is transformed by the polishing solution.

Further, there is possibility that a polishing solution, which is intended to be supplied to the contact portion 27 of the aluminum substrate 10 and the polishing body 26 may be erroneously attached to the front side in the outer peripheral surface 14 of the aluminum substrate 10 in relation to the polishing body 26. However, in the polishing apparatus 2, since the front portion of the outer peripheral surface 14 of the aluminum substrate 10 in relation to the polishing body 26 is washed by the second washing means 33, even when a polishing solution is erroneously attached to this portion, the polishing solution is removed. Therefore, transformation of the aluminum substrate 10 due to the polishing solution is more stably suppressed.

Further, in the polishing apparatus 2, a gas is blown to the front and rear sides of the polishing body 26 in the outer peripheral surface 14 of the aluminum substrate 10 by the first gas ejecting means 35 and the second gas ejecting means 37. According to this, since it is suppressed that a polishing solution flows out to a portion other than the contact portion 27 with the polishing body 26 in the outer peripheral surface 14 of the aluminum substrate 10, the transformation of the aluminum substrate 10 due to the polishing solution is more stable suppressed. Further, by blowing a gas, since entering of the washing liquid to the polishing solution can be suppressed, the composition of the polishing solution is difficult to change, and thus polishing can be performed more stably.

In the polishing apparatus 2 described above, by washing and removing a polishing solution on the outer peripheral surface of the cylindrical aluminum substrate by the washing means, the polishing solution does not remain on the outer peripheral surface of the aluminum substrate for a long time. Therefore, the transformation of the outer peripheral surface of the aluminum substrate due to the polishing solution can be suppressed.

Incidentally, the polishing apparatus used in the producing method according to the second embodiment of the invention is not limited to the polishing apparatus 2.

For example, the polishing apparatus used in the producing method according to the second embodiment of the invention may be an apparatus which does not include the second washing means 33 and does not wash the outer peripheral surface of the substrate at the front side of the polishing body moved in the axis direction. A polishing solution is not always attached to a portion, which is not polished yet, of the substrate at the front side of the polishing body. Further, even in a case where a polishing solution is erroneously attached to the front side of the polishing body, a portion to which the polishing solution is attached is not greatly separated from the contact portion in most cases. The portion is polished in a relatively short time. Therefore, an adverse effect of transformation, such as whitening, due to the polishing solution erroneously attached to the front side of the polishing body hardly occurs as compared with an adverse effect due to the polishing solution remaining on the rear side of the polishing body, and thus the transformation of the substrate can be sufficiently suppressed without the second washing means 33.

Figure 19:
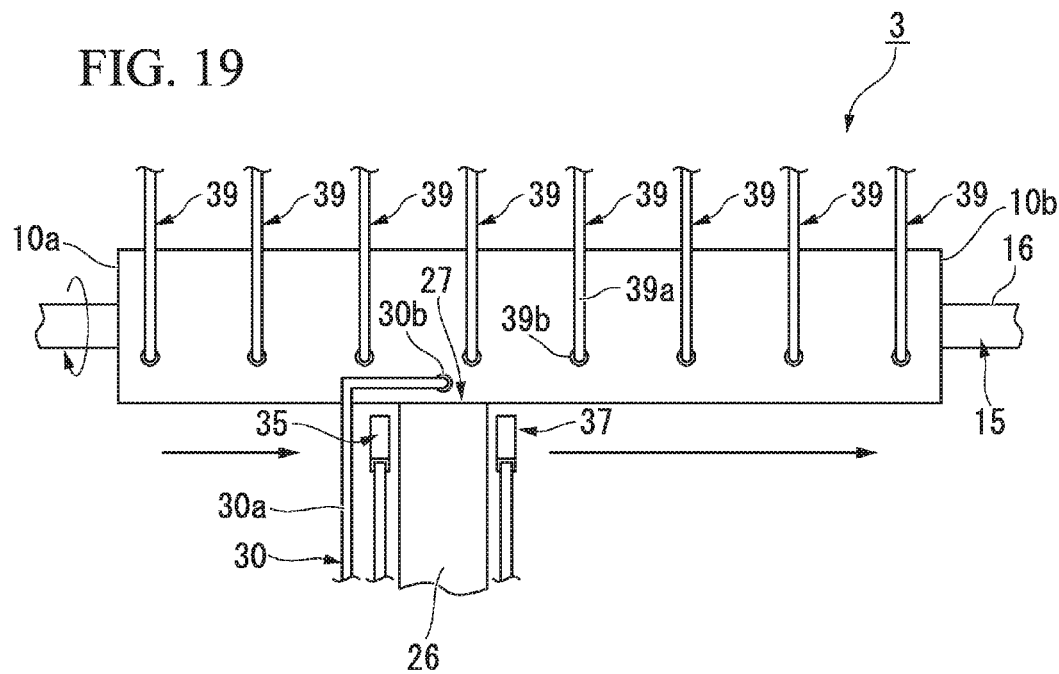
FIG. 19 is a plan view illustrating another aspect of the step (I) in the producing method according to the second embodiment of the invention.

Further, the polishing apparatus used in the producing method according to the second embodiment of the invention is not limited to the aspect in which the first washing means 31 or the second washing means 33 moves in the axis direction together with the polishing body 26. For example, a polishing apparatus 3 illustrated in FIG. 19 may be employed. The same portions in FIG. 19 as those in FIG. 18 are represented by the same symbols and description thereof will be omitted.

The polishing apparatus 3 has the same aspect as in the polishing apparatus 2, except that a plurality of washing means 39 are disposed along the axis direction in the range of the first end 10*a* to the second end 10*b* of the aluminum substrate 10 with an equal interval instead of the first washing means 31 and the second washing means 33.

Each washing means 39 includes a pipe pipe 39*a* sending a washing liquid and a nozzle 39*b* disposed at the tip end of the pipe 39*a*, and the position thereof is fixed.

In the polishing apparatus 3, a washing liquid is sequentially supplied from the respective washing means 39 according to the movement of the polishing body 26 to the axis direction, and washing is performed at the rear side of the polishing body 26 or both of the front side and the rear side of the polishing body 26 to remove a polishing solution.

Further, the polishing apparatus used in the producing method according to the second embodiment of the invention may be an apparatus which does not include one or both of the first gas ejecting means 35 and the second gas ejecting means 37.

Further, the polishing apparatus used in the producing method according to the second embodiment of the invention is not limited to an apparatus which includes a washing means for supplying a washing liquid to the outer peripheral surface of the aluminum substrate. For example, a polishing apparatus including a sponge or the like by which a polishing solution is wiped and removed from the outer peripheral surface of the aluminum substrate as a washing means may be employed.

Further, the polishing apparatus used in the producing method according to the second embodiment of the invention may be an apparatus in which polishing is performed by reciprocating the polishing body in the axis direction of the cylindrical aluminum substrate.

Further, in the polishing apparatuses 2 and 3, when a support member having substantially the same diameter as that of the aluminum substrate 10 is attached to an end of aluminum substrate 10 in the central axis direction, the producing method according to the first embodiment described above can be used. In this case, a residual abrasive grain removing means for removing aggregated abrasive grains remaining on the surface of the support member may be further provided.

<Method for Producing Mold>

Hereinafter, a producing method using the polishing apparatus 2 will be described as an example of the method for producing a mold according to the second embodiment of the invention. The method for producing a mold includes the following step (I) and step (II).

(I) As illustrated in FIG. 1 and FIG. 2, the outer peripheral surface 14 of the aluminum substrate 10 is polished by the polishing body 26 while the polishing body 26 and the aluminum substrate 10 rotating around the axis are relatively moved.

(II) After the step (I), an oxide film having a plurality of fine pores is formed on the outer peripheral surface 14 of the aluminum substrate 10 by anodization.

[Step (I)]

In the step (I) of this example, the whole outer peripheral surface 14 of the aluminum substrate 10 is polished by moving the polishing body 26 in the axis direction from the first end 10*a* to the second end 10*b* while the polishing body 26 is pressed against the outer peripheral surface 14 of the aluminum substrate 10 so as to be rubbed by rotating the aluminum substrate 10 around the axis. At this time, in the contact portion 27 with the polishing body 26 in the outer peripheral surface 14 of the aluminum substrate 10, a polishing solution for chemical mechanical polishing is supplied from the polishing solution supplying means 30.

The movement speed of the polishing body 26 along the axis direction of the aluminum substrate 10 may be constant or may be changed.

As a polishing solution for chemical mechanical polishing, from the viewpoint of polishing efficiency, an acidic CMP slurry is preferable in a case where the outer peripheral surface 14 of the aluminum substrate 10 is in a state of a coarse surface by mechanical processing, and an alkaline CMP slurry is preferable in a case where the outer peripheral surface is finished to be mirror-polished.

In the rear side of the polishing body 26 moving in the axis direction, a washing liquid is supplied from the first washing means 31 to wash the outer peripheral surface 14 of the aluminum substrate 10, thereby removing the polishing solution.

In the producing method according to the second embodiment of the invention, from the same reason in the case of washing the polishing solution in the first embodiment, it is preferable to perform washing of the outer peripheral surface 14 of the aluminum substrate 10 at the rear side of the polishing body 26 immediately after polishing body 26 passes. That is, it is preferable that a portion, which has been polished by the polishing body 26, in the outer peripheral surface 14 of the aluminum substrate 10 be immediately washed and the polishing solution be removed from the portion.

Further, it is more preferable to move the polishing body 26 in the axis direction while the outer peripheral surface 14 of the aluminum substrate 10 is continuously washed at the rear side of the polishing body 26. In this example, it is preferable to perform washing in such a manner that the first washing means 31 follows close behind the polishing body 26 and a washing liquid is continuously supplied to a portion, through which the polishing body 26 passes, in the outer peripheral surface 14 of the aluminum substrate 10.

In this example, also at the front side of the polishing body 26 moving in the axis direction, a washing liquid is supplied from the second washing means 33 to wash the outer peripheral surface 14 of the aluminum substrate 10, thereby removing the polishing solution. When the outer peripheral surface 14 of the aluminum substrate 10 is washed also at the front side of the polishing body 26 in this way, it is suppressed that the outer peripheral surface 14 of the aluminum substrate 10 is transformed by the polishing solution erroneously attached before polishing by the polishing body 26.

In the producing method according to the second embodiment of the invention, the washing of the outer peripheral surface 14 of the aluminum substrate 10 at the front side of the polishing body 26 is preferably performed at a position as close as possible to the contact portion 27 of the aluminum substrate 10 and the polishing body 26. According to this, it is possible to more stably suppress that a portion, which is not polished yet, in the outer peripheral surface 14 of the aluminum substrate 10 is transformed by the polishing solution.

Further, from the same reason in the case of washing the polishing solution in the first embodiment, it is preferable to move the polishing body 26 in the axis direction while the outer peripheral surface 14 of the aluminum substrate 10 is continuously washed at the front side of the polishing body 26. In this example, it is preferable to perform washing in such a manner that the second washing means 33 moves at the front side of the polishing body 26 in the axis direction and a washing liquid is continuously supplied to a portion in the outer peripheral surface 14 of the aluminum substrate 10 at the front side of the polishing body 26.

As a washing liquid, the same washing liquid as exemplified in the first embodiment is exemplified, and the preferred aspect thereof is also the same.

Further, in this example, similarly to the case of washing the polishing solution in the first embodiment, by blowing a gas at the both sides to the outer peripheral surface 14 of the aluminum substrate 10 by the first gas ejecting means 35 and the second gas ejecting means 37, it is suppressed that the supplied polishing solution flows out to a portion other than the contact portion 27. Further, by blowing a gas in a curtain-shaped manner from the first gas ejecting means 35 and the second gas ejecting means 37 so as to divide the contact portion 27 and the portion other than contact portion in the outer peripheral surface 14 of the aluminum substrate 10, it is also possible to suppress that the washing liquid enter the contact portion 27.

As a gas blown to both sides of the polishing body 26 in the outer peripheral surface 14 of the aluminum substrate 10, the same gas as exemplified in the first embodiment is exemplified, and the preferred aspect thereof is also the same.

The method for producing a mold according to the second embodiment is, similarly to the case of washing the polishing solution in the first embodiment, effective in the aspect in which the polishing body 26 is moved to one direction from the first end 10a to the second end 10b of the aluminum substrate 10 in the axis direction. Incidentally, the polishing body 26 may be reciprocated in the axis direction on the outer peripheral surface 14 of the aluminum substrate 10. In this case, the number of times at which the polishing body 26 is reciprocated may be appropriately set depending on conditions such as a target surface roughness, and may be 1 or 2 or more.

Further, the type of polishing in the step (I) is not particularly limited. For example, coarse polishing or final polishing exemplified in the first embodiment may be employed or both of the coarse polishing and the final polishing may be employed. Since an acidic polishing solution easily transforms the aluminum substrate, in the producing method according to the second embodiment of the invention, the acidic polishing solution is particularly effective in the case of performing the coarse polishing using an acidic polishing solution.

In the producing method according to the second embodiment of the invention, the outer peripheral surface 14 of the aluminum substrate 10 after polishing in the step (I) is preferably mirror-polished.

Incidentally, in the producing method according to the second embodiment of the invention, for example, in a case where the final polishing is performed using an alkaline polishing solution after the coarse polishing with an acidic polishing solution, polishing may be performed in the coarse polishing while washing is carried out as described above and polishing may be performed in the final polishing without performing washing, within the range not impairing the effect of the invention.

In the producing method according to the second embodiment of the invention, in a case where minute polishing flaws (scratches) may remain on the outer peripheral surface 14 after the step (I), it is preferable to perform the step (I') described in the first embodiment between the step (I) and the step (II).

<Step (II)>

The step (II) in the producing method according to the second embodiment of the invention can be performed in the same manner as in the step (II) in the first embodiment.

<Effect>

In the producing method according to the second embodiment of the invention described above, similarly to the case of washing the polishing solution in the first embodiment, occurrence of transformation, such as whitening phenomenon, due to the polishing solution in the outer peripheral surface 14 of the aluminum substrate 10 after polishing is suppressed. Therefore, a mold can be produced with high productivity.

Incidentally, the producing method according to the second embodiment of the invention is not limited to the above-described producing method.

For example, the producing method according to the second embodiment of the invention may be a method in which the outer peripheral surface of the aluminum substrate is not washed at the front side of the polishing body moving in the axis direction.

Further, the producing method according to the second embodiment of the invention may be a method using the polishing apparatus 3. In the method, a washing liquid is sequentially supplied from the respective washing means 39 according to the movement of the polishing body 26 to the axis direction, and washing is performed at the rear side of the polishing body 26 or both of the front side and the rear side of the polishing body 26.

Further, the producing method according to the second embodiment of the invention may be a method in which a gas is not blown to the both sides of the polishing body in the axis direction in the outer peripheral surface of the aluminum substrate.

Further, in the producing method according to the second embodiment of the invention, the method of washing the outer peripheral surface of the aluminum substrate is not limited to a method of performing washing with a washing liquid. For example, the method of washing the outer peripheral surface of the aluminum substrate may be a method in which the polishing solution is removed from the surface of the aluminum substrate by a sponge or the like.

Further, in the producing method according to the second embodiment of the invention, the polishing body may be moved in the axis direction with respect to the outer peripheral surface of the fixed aluminum substrate, the aluminum substrate may be moved in the axis direction thereof in a state where the position of the polishing body is fixed, or both of the aluminum substrate and the polishing body may be moved in the axis direction.

[Method for Producing Nanoimprinting Reproduction Mold]

Hereinafter, an example of the method for producing a nanoimprinting reproduction mold based on an embodiment of the invention will be described. The method for producing a nanoimprinting reproduction mold of this embodiment includes a polishing step and an oxide film forming step.

(Polishing Step)

The polishing step is a step of polishing a surface of a nanoimprinting mold which was used (hereinafter, also referred to as the "used mold").

Incidentally, the used mold indicates a mold in which a predetermined concave-convex microstructure cannot be transferred due to the accumulation of a curable resin composition on the surface of the mold, damages on the surface of the mold, or the transformation or the like of the concave-convex microstructure, or a mold in which damages on the surface of the mold become patterns and these patterns are transferred or a transfer article with a desired performance cannot be obtained, when the mold is repeatedly used.

In the used mold, an oxide film having a plurality of fine pores, that is, an oxide film having a concave-convex microstructure with a period equal to or more than the wavelength of visible light is formed. The shape of the used mold is not particularly limited, and examples thereof include a cylindrical shape (also including a circular tubular shape (a circular cylindrical shape)), a flat-plate shape, and a sheet shape.

In the polishing step, polishing is performed until at least the oxide film is removed. Further, in a case where the surface of the used mold is damaged, polishing is performed until the damage is removed. When the oxide film or the damage is removed by polishing, the used mold returns to a state of the aluminum substrate used as the material of the used mold.

A method of polishing the surface of the used mold is not particularly limited as long as it can remove the oxide film or the damage, but mechanical polishing is preferable. In particular, it is preferable to mechanically polish the surface of the used mold in plural times such that the polishing rate gradually decreases. When the surface of the used mold is mechanically polished in plural times, the oxide film or the damage is removed by polishing with a high polishing rate and the polished surface is finished by polishing with a low polishing rate.

When polishing is performed such that the polishing rate gradually decreases, as compared with a case where the surface of the used mold is polished only by polishing with a high polishing rate, it is possible to obtain an aluminum substrate in which the polished surface is further mirror-polished. Incidentally, even when the surface of the used mold is polished by polishing with a low polishing rate, it is possible to obtain an aluminum substrate in which the polished surface is further mirror-polished. However, it takes time to polish the surface. When polishing is performed such that the polishing rate gradually decreases, it is possible to obtain an aluminum substrate in which the polished surface is further mirror-polished in a short time.

As the polishing method with a high polishing rate, fixed abrasive grain polishing such as tape polishing is exemplified. Further, in a case where polishing with a high polishing rate is performed by isolated abrasive grain polishing such as chemical mechanical polishing (CMP polishing), abrasive grains having a large average particle diameter may be used. Specifically, abrasive grains having an average particle diameter of 0.5 µm or more are preferably used, and the average particle diameter is more preferably 1 µm or more and further preferably 3 µm or more. As abrasive grains, $Al_2O_3$ or the like is suitable.

The average particle diameter of abrasive grains can be obtained by measuring a slurry obtained by dispersing abrasive grains in a solvent such as water by using a particle size distribution measurement apparatus using a dynamic light scattering method or a laser diffraction-type particle size distribution measurement apparatus. In addition, the average particle diameter can also be measured by directly measuring abrasive grains with an electronic microscope such as SEM or TEM.

As the polishing method with a low polishing rate, isolated abrasive grain polishing such as CMP polishing is exemplified. As abrasive grains having a small average particle diameter is used, the polishing rate tends to decrease. Specifically, abrasive grains having an average particle diameter of less than 1 µm is preferably used, and the average particle diameter is more preferably less than 0.5 µm and further preferably 0.1 µm or less. As abrasive grains, $SiO_2$ or the like is suitable.

In the polishing step, it is preferable to perform polishing with the polishing method with a low polishing rate after the surface of the used mold is polished by the polishing method with a high polishing rate. In particular, it is preferable to perform CMP polishing as the polishing method with a low polishing rate after the surface of the used mold is polished by fixed abrasive grain polishing as the polishing method with a high polishing rate. CMP polishing herein is preferably performed two or more times while abrasive grains are changed.

In a case where CMP polishing is preformed two or more times after fixed abrasive grain polishing, in the invention, the first CMP polishing is also referred to as "coarse polishing" and the second or later CMP polishing is also referred to as "final polishing."

Further, in a case where both the polishing method with a high polishing rate and the polishing method with a low polishing rate are performed by CMP polishing, CMP polishing is performed at least twice in the polishing step. In this case, CMP polishing is preferably performed three or more times while abrasive grains are changed.

In a case where both the polishing method with a high polishing rate and the polishing method with a low polishing rate are performed by CMP polishing and CMP polishing is performed three or more times, in the invention, the first CMP polishing is also referred to as "pre-treatment polishing," the second CMP polishing is also referred to as "coarse polishing," and the third or later CMP polishing is also referred to as "final polishing."

When CMP polishing is performed two or more times, it is preferable to change abrasive grains such that the average particle diameter of abrasive grains decreases as the number of times of CMP polishing increases.

The method of polishing the surface of the used mold by fixed abrasive grain polishing or CMP polishing is not particularly limited, but a well-known method can be employed. In addition, a well-known polishing apparatus can also be used.

Herein, for the method of polishing the surface of the used mold by CMP polishing, in the case of the used mold having a cylindrical aluminum substrate, the methods like the step (I) and the step (I) in the first embodiment and the second embodiment described above can be used.

In order to check the removal of the oxide film or the damage from the surface of the used mold, an electronic microscope may be used for check. For example, existence of the oxide film or the damage is checked in such a manner that platinum is vapor-deposited for 1 minute on the longitudinal cross-section or the surface of the aluminum substrate obtained by polishing the surface of the used mold, the cross-section or the surface is observed using a field emission-type scanning electron microscope.

Incidentally, the polishing step may be performed by a method other than mechanical polishing (another treatment method), or mechanical polishing and another treatment method may be used together. However, in the case of mechanical processing using a blade such as cutting processing or grinding processing, as described above, an affected layer may be formed on the surface or trace of mechanical processing such as cutting streaks may remain on the surface. For this reason, it is necessary to remove an affected layer or trace of mechanical processing. However, time and effort is required until anodization is performed, and this leads to cost increase. Therefore, in the invention, mechanical processing is not performed.

As a method suitable for another treatment method, etching, electrolytic polishing, chemical polishing, or the like is exemplified.

When mechanical polishing is performed together with another treatment method, there is no limitation on the order thereof, it is preferable that after the surface of the used mold is treated by another treatment method to some extent, mechanical polishing be performed. When mechanical polishing is performed after another treatment method, it is possible to obtain the surface of the aluminum substrate, which is further mirror-polished, after the polishing step.

However, in consideration of the removing time and workability, in the polishing step, it is preferable to perform only mechanical polishing.

(Oxide Film Forming Step)

The oxide film forming step can be performed in the same manner as in the step (II) in the first embodiment.

(Effect)

As described above, when a mold is repeatedly used, a resin is accumulated on the surface of the mold, the surface of the mold is damaged, or the concave-convex microstructure is transformed, and thus the mole outlives its usefulness.

However, according to the method for producing a nanoimprinting reproduction mold of the invention, by polishing the surface of the used mold in the polishing step to remove the oxide film, not only the resin accumulated on the surface of the mold but also the concave-convex microstructure itself can be removed. Further, in a case where the surface of the mold is damaged, the damage can also be removed by polishing. When the surface of the used mold is polished in the polishing step in this way, the used mold returns to a state of the material of the mold, that is, the original aluminum substrate. This aluminum substrate is anodized to form again an oxide film having a concave-convex microstructure with a period equal to or more than the wavelength of visible light. Therefore, a nanoimprinting mold can be produced by reusing the used mold.

In addition, in the method for producing a nanoimprinting reproduction mold of the invention, since the oxide film or the damage is not removed by mechanical processing such as cutting processing but is removed by polishing, there is no concern that an affected layer or trace of mechanical processing causing an increase in haze is formed on the surface of the aluminum substrate. Therefore, time and effort for removing an affected layer or trace of mechanical processing is omitted, and cost can be reduced. Moreover, since an affected layer is not formed on the surface of the aluminum substrate, it is possible to form again an oxide film having fine pores uniformly dispersed when anodization is performed.

In this way, according to the method for producing a nanoimprinting reproduction mold of the invention, the used mold is reused, and thus an oxide film having fine pores uniformly dispersed can be formed. Therefore, a nanoimprinting reproduction mold by which an article with low haze can be obtained can be produced at low cost.

Another Embodiment

In the method for producing a nanoimprinting reproduction mold of the invention, the polishing step may include an oxide film removing treatment or a resin removing treatment which will be described below.

<Oxide Film Removing Treatment>

The oxide film removing treatment is a treatment in which the oxide film on the surface of the used mold is chemically removed.

The oxide film formed on the surface of the mold has a higher hardness than that of an aluminum material used in a substrate of the mold in many cases. When such a hard oxide film is removed by polishing, the processing time may be lengthened in some cases. For this reason, when the oxide film is chemically removed in advance, the polishing time for removing the oxide film in the polishing step can be shortened. In the method for producing a nanoimprinting reproduction mold of the invention, in the polishing step, it is preferable that the aluminum substrate be subjected to chemical mechanical polishing after the oxide film is chemically removed.

As a method of chemically removing the oxide film, a method is preferable in which the oxide film is dissolved and removed using an solution that is less likely to dissolve the aluminum substrate of the mold and selectively dissolves only the oxide film. As such a solution, a mixed solution of chromic acid and phosphoric acid is preferable.

The mold is usually produced by anodizing an aluminum substrate in which an affected layer, which is generated in mirror polishing and cutting processing, on the surface is removed. Therefore, if the oxide film on the surface of the used mold is removed, it is also possible to form again an oxide film having a concave-convex microstructure by anodizing the surface after removal.

However, when the oxide film is chemically removed, the surface of the mold after removal (that is, the surface of the aluminum substrate) is slightly dissolved, and thus the surface state deteriorates. In addition, when the surface of the used mold is damaged, the damage cannot be removed sufficiently by the oxide film removing step.

Therefore, after the oxide film removing step, the above-described polishing step is performed. When the polishing step is performed after the oxide film removing step, in a case where the oxide film, which is not completely removed in the oxide film removing step, remains, the oxide film can be removed in the polishing step. Further, in a case where the surface of the used mold is damaged, this damage can be removed. Furthermore, in a case where the surface state after oxide film removing step deteriorates, the surface can be smoothened.

Further, the oxide film is harder that an aluminum material used in the aluminum substrate. For this reason, in a case where the outer peripheral surface of the cylindrical aluminum substrate having the oxide film formed on the surface thereof is polished by the polishing body having a length in the axis direction shorter than that of the aluminum substrate while the polishing body is moved in the axis direction, polishing for a longer time is required in many cases. That is, the contact time of the mold with an acidic or alkaline polishing solution used for polishing tends to increase. For this reason, when the oxide film is intended to be removed from the mold having the oxide film formed on the surface thereof, the inventors of this application found that the aluminum substrate is transformed and whitening phenomenon tends to easily occur.

The whitened portion in the aluminum substrate is difficult to grind by polishing as compared with a portion other than whitened portion. For this reason, when whitening occurs once on the outer peripheral surface of the aluminum substrate, it takes a long time to mirror-polish the surface while excluding the whitened portion. As a result, in addition to the fact that it takes time to remove the hard oxide film is required, it takes a long time to remove the whitened portion. Therefore, an excessively long time is required for producing a reproduction mold.

On the other hand, when the surface of the aluminum substrate is polished by chemical mechanical polishing or the like after the method of chemically removing the oxide film, the time for removing the hard oxide film by polishing is shortened. Therefore, it is suppressed that transformation, such as whitening phenomenon, due to the polishing solution occurs on the outer peripheral surface of the aluminum substrate after polishing. As a result, it is possible to produce a nanoimprinting reproduction mold with high productivity.

<Resin Removing Treatment>

The resin removing treatment is a step of removing a resin (a photocurable resin or the like) attached to (accumulated on) the surface of the used mold before the oxide film removing step.

In a case where a resin is accumulated on the surface of the used mold, the resin cannot be removed sufficiently in the oxide film removing step. Further, the resin may interfere with the chemical removal of the oxide film in the oxide film removing step. If the resin is removed in advance, the oxide film can be easily removed in a short time in the oxide film removing step.

As a method of removing a rein, a method is preferable in which the resin is washed and removed using an solution that is less likely to dissolve the aluminum substrate of the mold and selectively dissolves only the resin. Such a solution can be decided depending on the type of resins, and for example, a solvent such as acetone or ethanol is exemplified.

Incidentally, even in a case where the method for producing a nanoimprinting reproduction mold of the invention does not include the oxide film removing step, a resin attached to the surface of the used mold may be removed before the polishing step.

The resin can be removed in the polishing step, but if the resin is removed in advance, the polishing time for removing the oxide film in the polishing step can be shortened.

EXAMPLES

Hereinafter, the invention will be described in detain by means of Examples, but the invention is not limited to the following description.

[Surface Roughness]

In the outer peripheral surface of the aluminum substrate in each example, the arithmetic mean roughness Ra was measured with a surface roughness and shape measuring machine SURFCOM 1500DX manufactured by TOKYO SEIMITSU CO., LTD. on the basis of the standard of JIS B 0601:1994.

Further, in an outer peripheral surface of a replica obtained in each example, the arithmetic mean roughness Ra was measured with a surface roughness and shape measuring machine SURFCOM 1500DX manufactured by TOKYO SEIMITSU CO., LTD. by the method defined in JIS B 0601:1994. The measurement position was set to a position of 10 mm apart from the first end 10a of the aluminum substrate 10 every 10 mm up to a position of 70 mm.

Example 1

As illustrated in FIGS. 1 to 4, the first support member 18 and the second support member 20 were disposed at the first end 10a side and the second end 10b side of the cylindrical aluminum substrate 10, respectively, and the whole outer peripheral surface 14 of the aluminum substrate 10 was polished by the polishing means 12.

As the aluminum substrate 10, a cylindrical aluminum substrate having an aluminum purity of 99.99% and the length L1 in the axis direction of 700 mm was used. Further, as the polishing body 26, a polishing pad (non-woven fabric made of polyester, foamed polyurethane suede) having the length L2 along the axis direction of the aluminum substrate 10 of 100 mm was used. As the first support member 18 and the second support member 20, a cylindrical sleeve having a length along the axis direction of the aluminum substrate 10 of 100 mm and made of the same material as that of the aluminum substrate 10 was used. The outer diameter D of the aluminum substrate 10, the outer diameter d1 of the first support member 18, and the outer diameter d2 of the second support member 20 were set to be the same. As a polishing slurry, a slurry containing $SiO_2$ particles having an average particle diameter of 0.1 μm was used.

The whole outer peripheral surface 14 of the aluminum substrate 10 was polished by reciprocating the polishing body 26 at a movement speed along the axis direction of 20 cm/min. Further, a portion, through which the polishing body 26 passed, in the outer peripheral surface 14 of the aluminum substrate 10 was polished while the polishing slurry was washed and removed with pure water. In addition, at the first end 10a side and the second end 10b side of the aluminum substrate 10, the lengths in the axis direction of portions beyond which the polishing body 26 was protruded were set to 70 mm (L3/L2=L4/L2=0.7).

After the completion of polishing, a photocurable resin was applied onto the outer peripheral surface 14 of the aluminum substrate 10 and irradiated with ultraviolet rays to form a cured resin layer, thereby preparing a replica of a mold. As the photocurable resin composition, the compositions presented in the following Table 1 were used.

TABLE 1

| | Part(s) by mass |
|---|---|
| Condensation reaction mixture of succinic acid/trimethylolethane/acrylic acid (molar ratio: 1:1:1) | 60 |
| Polyethylene glycol diacrylate (manufactured by Shin-Nakamura Chemical Co., Ltd., A-600) | 30 |
| Methyl acrylate (manufactured by Mitsubishi Chemical Corporation) | 10 |
| Alkylphenone-based photopolymerization initiator (manufactured by Ciba Specialty Chemicals K.K., Irg. 184) | 1.0 |
| Acyl phosphine oxide-based photopolymerization initiator (manufactured by Ciba Specialty Chemicals K.K., Irg. 819) | 0.1 |
| Phosphoric acid ester-based mold release agent (manufactured by Axel Plastics Research Laboratories, Inc. INT-1856) | 0.3 |

Comparative Example 1

Polishing was performed in the same manner as in Example 1, except that the first support member 18 and the second support member 20 were not disposed and polishing was performed such that the polishing body 26 did not protrude in the range of the first end 10a to the second end 10b of the aluminum substrate 10, and a replica of a mold was thereby prepared.

Figure 12:
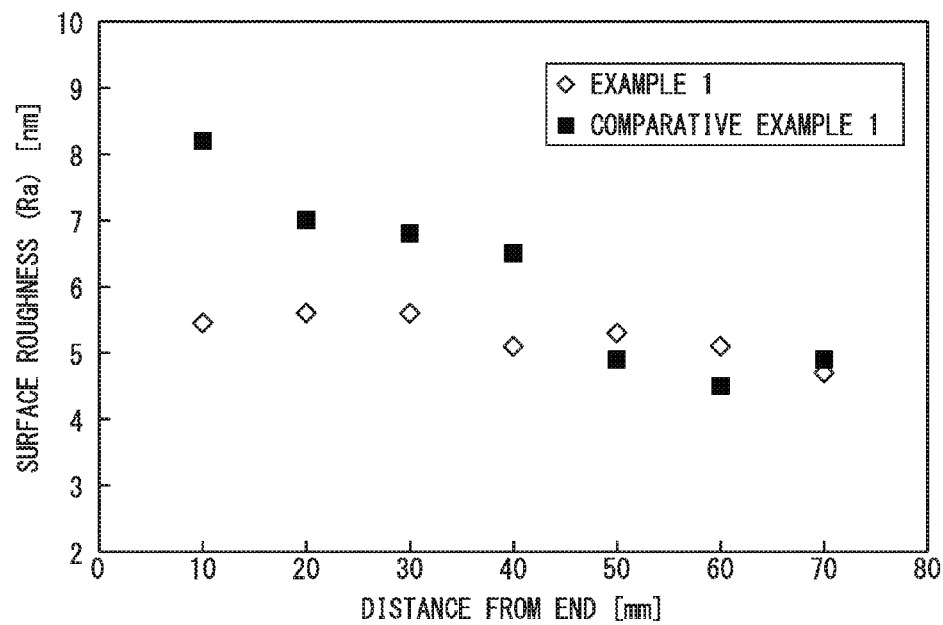
FIG. 12 is a graph showing measurement results of surface roughness in Example 1 and Comparative Example 1.

The measurement results of the surface roughness in Example 1 and Comparative Example 1 are shown in FIG. 12.

As shown in FIG. 12, in Example 1 in which polishing was performed such that a part of the polishing body 26 was protruded at the first end 10a side and the second end 10b side of the aluminum substrate 10, as compared with Comparative Example 1 in which polishing was performed such that the polishing body 26 did not protrude beyond the aluminum substrate 10, the surface roughness in the vicinity of the end was uniform.

Reference Example 1

When the aluminum substrate was polished in the same manner as in Example 1, minute polishing flaws occurred on the outer peripheral surface of the aluminum substrate. In order to remove the polishing flaws, the polishing of the aluminum substrate was continued in the same polishing conditions as in Example 1. When the same polishing as in Example 1 was repeatedly performed three times, it was possible to obtain an aluminum substrate having no polishing flaw on the outer peripheral surface and also having a uniform surface roughness in the vicinity of the end.

Reference Example 2

When the aluminum substrate was polished in the same manner as in Example 1, minute polishing flaws occurred on the outer peripheral surface of the aluminum substrate. In order to remove the polishing flaws, polishing was further performed such that the polishing body 26 did not protrude beyond the aluminum substrate 10. The polishing conditions were set to be the same as in Example 1, except that the polishing body 26 was not allowed to overrun. When the polishing of the aluminum substrate was continued, the same polishing as in Example 1 was repeatedly performed once, and thus it was possible to obtain an aluminum substrate having no polishing flaw on the outer peripheral surface and also having a uniform surface roughness in the vicinity of the end.

From the comparison of Reference Example 1 and Reference Example 2, when polishing was continued in order to remove polishing flaws after the whole outer peripheral surface of the aluminum substrate 10 was polished, it was found that the polishing of the outer peripheral surface of the aluminum substrate 10 could be completed in a shorter time in the case of continuing polishing under the condition that the polishing body 26 did not overrun.

Example 2

As illustrated in FIG. 17 and FIG. 18, the whole outer peripheral surface 14 of the aluminum substrate 10 was coarsely polished until the arithmetic mean roughness Ra became 20 nm by moving the polishing body 26 to one direction in the axis direction from the first end 10a to the second end 10b of the cylindrical aluminum substrate 10.

As the aluminum substrate 10, a cylindrical aluminum substrate having an aluminum purity of 99.99% and the length L1 in the axis direction of 700 mm was used. Further, as the polishing body 26, a polyester non-woven fabric polishing pad having the length L2 along the axis direction of the aluminum substrate 10 of 100 mm was used. As a polishing solution, an acidic slurry with pH 2 to 6 containing $Al_2O_3$ particles having an average particle diameter of 1 μm was used.

The movement speed along the axis direction of the polishing body 26 was set to 20 cm/min, and the outer peripheral surface 14 of the aluminum substrate 10 was washed with a washing liquid at the front side and the rear side of the polishing body 26. As the washing liquid, pure water was used. Blowing of a gas at the front side and the rear side in the axis direction of the polishing body 26 was not performed.

After coarse polishing, final polishing was performed in the same manner as in coarse polishing described above until a mirror surface having an arithmetic mean roughness Ra of 5 nm was obtained, except that a slurry with pH 8 to 14 containing $SiO_2$ particles having an average particle diameter of 0.1 μm was used as a polishing solution.

The total time required for coarse polishing and final polishing was 100 minutes.

Comparative Example 2

Coarse polishing and final polishing were performed in the same manner as in Example 2, except that the outer peripheral surface 14 of the aluminum substrate 10 was not washed at the front side and the rear side of the polishing body 26.

Whitening phenomenon was observed on the outer peripheral surface 14 of the aluminum substrate 10 after coarse polishing, and the total time required for coarse polishing and final polishing was 170 minutes Example 3

After continuously producing an article having fine concavity and convexity on the surface thereof, the mold in which an oxide film was formed on the aluminum substrate with an aluminum purity of 99.9% was immersed in an aqueous solution (70° C.) obtained by mixing 6% by mass of phosphoric acid and 1.8% by mass of chromic acid to dissolve and remove the oxide film. Thereafter, the surface of the aluminum substrate was coarsely polished in the same manner as in Example 2 until the arithmetic surface roughness became 30 nm. The time required for coarse polishing was 35 minutes.

Thereafter, final polishing was further performed by the same method as in Example 2, and steps (a) to (e) to be described later were performed, thereby forming a concave-convex microstructure.

Step (a):
The temperature of a 0.3 M oxalic acid aqueous solution was adjusted to 15.7° C., the aluminum substrate was immersed therein, and then the aluminum substrate was anodized at 40 V for 3 minutes, thereby forming an oxide film having fine pores.

Step (b):
The aluminum substrate having an oxide film formed thereon was immersed in an aqueous solution (70° C.) obtained by mixing 6% by mass of phosphoric acid and 1.8% by mass of chromic acid to dissolve and remove at least a part of the oxide film, thereby forming anodized fine pore generation points.

Step (c):
The aluminum substrate in which the fine pore generation points were exposed was anodized again at 40 V for 60 seconds under the same condition as in the step (a) to form an oxide film having fine pores at the fine pore generation points on the surface of the aluminum substrate again.

Step (d):
The aluminum substrate having the oxide film formed thereon was immersed in an aqueous solution (30° C.) of 5% by mass of phosphoric acid to perform the pore diameter-increasing process of increasing the diameter of the fine pores of the oxide film.

Step (e):
After the step (d), the aluminum substrate having the oxide film formed thereon was anodized again at 40 V for 60 seconds under the same condition as in the step (a).

Step (f):
The step (d) and the step (e) were alternately repeated further three times and then the step (d) was finally performed. That is, the step (e) was performed four times in total and the step (d) was performed five times in total.

Thereafter, the oxide film was washed with deionized water and further the moisture on the surface was removed by air blow, thereby obtaining a cylindrical nanoimprinting reproduction mold on which an oxide film having fine pores which has a substantially conical shape, an average interval of 100 nm, and an average depth of about 200 nm is formed. When an article having fine concavity and convexity on the surface thereof was continuously produced by this mold, it was possible to continuously obtain an article with quality as stable as before reproduction.

Example 4

After continuously producing an article having fine concavity and convexity on the surface thereof, an aluminum substrate was coarsely polished in the same manner as in Example 2 until the arithmetic mean roughness became 30 nm, without the aluminum substrate being immersed in an aqueous solution (70° C.) obtained by mixing 6% by mass of phosphoric acid and 1.8% by mass of chromic acid. The time required for coarse polishing was 70 minutes.

Thereafter, a nanoimprinting reproduction mold was produced in the same manner as in Example 3. When an article having fine concavity and convexity on the surface thereof was continuously produced by this mold, it was possible to continuously obtain an article with quality as stable as before reproduction.

EXPLANATIONS OF LETTERS OR NUMERALS

1 CYLINDRICAL NANOIMPRINTING MOLD
2, 3 POLISHING APPARATUS
10 ALUMINUM SUBSTRATE
10*a* FIRST END
10*b* SECOND END
12 POLISHING MEANS
14 OUTER PERIPHERAL SURFACE
15 RUBBING MEANS
16 ROTATION AXIS
18 FIRST SUPPORT MEMBER
20 SECOND SUPPORT MEMBER
26 POLISHING BODY
28 CONVEYANCE ROLL
30 POLISHING SOLUTION SUPPLYING MEANS
31 FIRST WASHING MEANS
33 SECOND WASHING MEANS

35 FIRST GAS EJECTING MEANS
37 SECOND GAS EJECTING MEANS
39 WASHING MEANS
50 RESIDUAL ABRASIVE GRAIN REMOVING MEANS
32 OXIDE FILM
36 FINE PORES
40, 42 GAP

The invention claimed is:

1. A method for producing a cylindrical nanoimprinting mold in which an oxide film having a plurality of fine pores is formed on an outer peripheral surface of a cylindrical aluminum substrate, the method comprising:
   a step (I) of polishing the whole outer peripheral surface of the aluminum substrate by rubbing the outer peripheral surface of the aluminum substrate with a polishing body, which has a length along an axis direction of the aluminum substrate shorter than a length of the aluminum substrate in the axis direction, while relatively moving the polishing body and the aluminum substrate rotating around a central axis; and
   a step (II) of forming the oxide film on the outer peripheral surface of the aluminum substrate by anodization after the step (I), wherein
   in the step (I), support members are disposed at both ends of the aluminum substrate in the central axis direction and polishing is performed by relatively moving the polishing body in the axis direction with respect to the outer peripheral surface of the aluminum substrate rotating around the axis such that at least a part of the polishing body protrudes beyond the end of the aluminum substrate in the axis direction,
   at least the part, which protrudes beyond the aluminum substrate, of the polishing body is disposed on the support member, and
   the shape obtained by cutting the surface of the portion, in which the polishing body is disposed, of the support member in a direction perpendicular to the axis direction of the aluminum substrate is an arc shape configuring at least a part of circumference having a diameter substantially equal to or less than the outer diameter of the aluminum substrate.

2. The method for producing a cylindrical nanoimprinting mold according to claim 1, wherein the outer shape of a portion, in which the polishing body is disposed, of the support member is a shape configuring at least a part of a cylindrical shape having an outer diameter 0.97 or more times but 1 or less times the outer diameter of the aluminum substrate.

3. The method for producing a cylindrical nanoimprinting mold according to claim 2, wherein the outer shape of the support member is cylindrical.

4. The method for producing a cylindrical nanoimprinting mold according to claim 1, wherein the portion, in which the polishing body is disposed, of the support member is made of the same material as that of the aluminum substrate.

5. The method for producing a cylindrical nanoimprinting mold according to claim 1, further comprising a step (I') of performing polishing by relatively moving the polishing body in the axis direction such that the polishing body does not protrude beyond the aluminum substrate, between the step (I) and the step (II).

6. The method for producing a cylindrical nanoimprinting mold according to claim 1, wherein in the step (I), polishing is performed by the polishing body while supplying an abrasive grain to the outer peripheral surface of the aluminum substrate, and the residual abrasive grain remaining on the surface of the support member is removed.

7. The method for producing a cylindrical nanoimprinting mold according to claim 1, wherein in the step (I), a polishing solution for chemical mechanical polishing is supplied to a contact portion with the polishing body in the outer peripheral surface of the aluminum substrate, and the outer peripheral surface of the aluminum substrate is washed at the rear side of the polishing body moving in the axis direction to remove the polishing solution.

8. The method for producing a cylindrical nanoimprinting mold according to claim 7, wherein the polishing body is moved to one direction from a first end to a second end of the aluminum substrate in the axis direction.

9. The method for producing a cylindrical nanoimprinting mold according to claim 7, wherein the outer peripheral surface of the aluminum substrate is further washed also at the front side of the polishing body moving in the axis direction to remove the polishing solution.

10. The method for producing a cylindrical nanoimprinting mold according to claim 7, wherein a gas is blown at both sides of the polishing body in the axis direction to the outer peripheral surface of the aluminum substrate.

11. A method for producing a cylindrical nanoimprinting mold in which an oxide film having a plurality of fine pores is formed on an outer peripheral surface of a cylindrical aluminum substrate, the method comprising:
   a step (I) of polishing the whole outer peripheral surface of the aluminum substrate by rubbing the outer peripheral surface of the aluminum substrate with a polishing body, which has a length along an axis direction of the aluminum substrate shorter than a length of the aluminum substrate in the axis direction, while relatively moving the polishing body and the aluminum substrate rotating around an axis; and
   a step (II) of forming the oxide film on the outer peripheral surface of the aluminum substrate by anodization after the step (I), wherein
   in the step (I), a polishing solution for chemical mechanical polishing is supplied to a contact portion with the polishing body in the outer peripheral surface of the aluminum substrate, and the outer peripheral surface of the aluminum substrate is washed at the rear side of the polishing body moving in the axis direction to remove the polishing solution.

12. The method for producing a cylindrical nanoimprinting mold according to claim 11, wherein the polishing body is moved to one direction from a first end to a second end of the aluminum substrate in the axis direction.

13. The method for producing a cylindrical nanoimprinting mold according to claim 11, wherein the outer peripheral surface of the aluminum substrate is further washed also at the front side of the polishing body moving in the axis direction to remove the polishing solution.

14. The method for producing a cylindrical nanoimprinting mold according to claim 11, wherein a gas is blown at both sides of the polishing body in the axis direction to the outer peripheral surface of the aluminum substrate.

15. A method for producing a nanoimprinting reproduction mold, the method comprising:
   a polishing step of polishing a surface of a nanoimprinting mold in which an oxide film having a plurality of fine pores is formed on a surface of an aluminum substrate; and
   an oxide film forming step of forming again an oxide film, which has a plurality of fine pores on a surface of an aluminum substrate, by anodizing the polished surface.

16. The method for producing a nanoimprinting reproduction mold according to claim 15, wherein the polishing step includes a treatment of chemically removing the oxide film having a plurality of fine pores on the surface of the nanoimprinting mold.

17. The method for producing a nanoimprinting reproduction mold according to claim 16, wherein the oxide film is chemically removed using a mixed solution of chromic acid and phosphoric acid.

18. The method for producing a nanoimprinting reproduction mold according to claim 16, further comprising a resin removing step of removing a resin attached to the surface of the nanoimprinting mold having a plurality of fine pores on the surface thereof, before the polishing step.

19. The method for producing a nanoimprinting reproduction mold according to claim 16, wherein the aluminum substrate is subjected to chemical mechanical polishing after the oxide film is chemically removed in the polishing step.

20. The method for producing a nanoimprinting reproduction mold according to claim 19, wherein
the outer shape of the aluminum substrate is cylindrical,
the polishing step includes a step (I) of polishing the whole outer peripheral surface of the aluminum substrate by rubbing the outer peripheral surface of the aluminum substrate with a polishing body, which has a length along an axis direction of the aluminum substrate shorter than a length of the aluminum substrate in the axis direction, while relatively moving the polishing body and the aluminum substrate rotating around a central axis,
in the step (I), support members are disposed at both ends of the aluminum substrate in the central axis direction and polishing is performed by relatively moving the polishing body in the axis direction with respect to the outer peripheral surface of the aluminum substrate rotating around the axis such that at least a part of the polishing body protrudes beyond the end of the aluminum substrate in the axis direction,
at least the part, which protrudes beyond the aluminum substrate, of the polishing body is disposed on the support member, and
the shape obtained by cutting the surface of the portion, in which the polishing body is disposed, of the support member in a direction perpendicular to the axis direction of the aluminum substrate is an arc shape configuring at least a part of circumference having a diameter substantially equal to or less than the outer diameter of the aluminum substrate.

21. The method for producing a nanoimprinting reproduction mold according to claim 20, wherein the outer shape of a portion, in which the polishing body is disposed, of the support member is a shape configuring at least a part of a cylindrical shape having an outer diameter 0.97 or more times but 1 or less times the outer diameter of the aluminum substrate.

22. The method for producing a nanoimprinting reproduction mold according to claim 20, wherein the polishing step further includes a step (I') of performing polishing by relatively moving the polishing body in the axis direction such that the polishing body does not protrude beyond the aluminum substrate, after the step (I).

23. The method for producing a nanoimprinting reproduction mold according to claim 20, wherein in the step (I), a polishing solution for chemical mechanical polishing is supplied to a contact portion with the polishing body in the outer peripheral surface of the aluminum substrate, and the outer peripheral surface of the aluminum substrate is washed at the rear side of the polishing body moving in the axis direction to remove the polishing solution.

24. The method for producing a nanoimprinting reproduction mold according to claim 23, wherein the polishing body is moved to one direction from a first end to a second end of the aluminum substrate in the axis direction.

25. The method for producing a nanoimprinting reproduction mold according to claim 24, wherein the outer peripheral surface of the aluminum substrate is further washed also at the front side of the polishing body moving in the axis direction to remove the polishing solution.

26. The method for producing a nanoimprinting reproduction mold according to claim 25, wherein a gas is blown at both sides of the polishing body in the axis direction to the outer peripheral surface of the aluminum substrate.

* * * * *